US008684843B2

(12) United States Patent
Arezina et al.

(10) Patent No.: US 8,684,843 B2

(45) Date of Patent: *Apr. 1, 2014

(54) HANDHELD WAGERING GAME SYSTEM AND METHODS FOR CONDUCTING WAGERING GAMES THEREUPON

(75) Inventors: Vladimir I. Arezina, River Forest, IL (US); Mark B. Gagner, West Chicago, IL (US); Jeremy M. Hornik, Chicago, IL (US); Larry J. Pacey, Chicago, IL (US); Richard T. Schwartz, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,699

(22) Filed: Jun. 28, 2012

(65) Prior Publication Data

US 2012/0276990 A1 Nov. 1, 2012

Related U.S. Application Data

(63) Continuation of application No. 12/303,232, filed as application No. PCT/US2007/012759 on May 30, 2007, now Pat. No. 8,282,490.

(60) Provisional application No. 60/855,635, filed on Oct. 31, 2006, provisional application No. 60/810,926, filed on Jun. 2, 2006.

(51) Int. Cl.
*A63F 13/00* (2006.01)

(52) U.S. Cl.
USPC .................... 463/42; 463/39; 463/40; 463/41

(58) Field of Classification Search
USPC ...................................................... 463/39–42
See application file for complete search history.

(56) References Cited

U.S. PATENT DOCUMENTS

| | | | | |
|---|---|---|---|---|
| 4,339,798 | A | 7/1982 | Hedges et al. | 364/412 |
| 4,455,025 | A | 6/1984 | Itkis | 273/237 |
| 4,624,462 | A | 11/1986 | Itkis | 273/237 |
| 5,102,138 | A | 4/1992 | Johnson | 273/144 |
| 5,618,232 | A | 4/1997 | Martin | 463/25 |

(Continued)

FOREIGN PATENT DOCUMENTS

| | | |
|---|---|---|
| JP | 2003-021674 | 1/2003 |
| JP | 2003-135856 | 5/2003 |

(Continued)

OTHER PUBLICATIONS

MagiQuest—The Game Lives on (2006); available at http://www.magiquestmb.com/The Game/; retrieved on Jun. 16, 2006; (12 pages).

(Continued)

*Primary Examiner* — Arthur O. Hall
*Assistant Examiner* — Jeffrey Wong
(74) *Attorney, Agent, or Firm* — Nixon Peabody LLP

(57) ABSTRACT

A gaming system for conducting a wagering game includes a handheld gaming machine configured to play at least one game and a controller. The controller is configured to base eligibility of the handheld gaming machine for a game-related feature at least upon a location of the handheld gaming machine and/or a proximity of the handheld gaming machine to an external device.

20 Claims, 14 Drawing Sheets

(56) References Cited

U.S. PATENT DOCUMENTS

| | | | | |
|---|---|---|---|---|
| 5,833,536 | A | 11/1998 | Davids et al. | 463/11 |
| 6,001,016 | A | 12/1999 | Walker et al. | 463/42 |
| 6,012,983 | A | 1/2000 | Walker et al. | 463/20 |
| 6,104,815 | A | 8/2000 | Alcorn et al. | 380/258 |
| 6,117,013 | A | 9/2000 | Eiba | 463/41 |
| 6,135,884 | A | 10/2000 | Hedrick et al. | 463/20 |
| 6,135,887 | A | 10/2000 | Pease et al. | 463/42 |
| 6,270,410 | B1 | 8/2001 | DeMar et al. | 463/42 |
| 6,409,602 | B1 | 6/2002 | Wiltshire et al. | 463/42 |
| 6,488,585 | B1 | 12/2002 | Wells et al. | 463/43 |
| 6,508,710 | B1 | 1/2003 | Paravia et al. | 463/42 |
| 6,527,638 | B1 | 3/2003 | Walker et al. | 463/25 |
| 6,628,939 | B2 | 9/2003 | Paulsen | 455/414 |
| 6,665,715 | B1 | 12/2003 | Houri | 709/223 |
| 6,676,522 | B2 | 1/2004 | Rowe et al. | 463/42 |
| 6,682,421 | B1 | 1/2004 | Rowe et al. | 463/25 |
| 6,761,637 | B2 | 7/2004 | Weston et al. | 463/42 |
| 6,800,029 | B2 | 10/2004 | Rowe et al. | 463/25 |
| 6,843,725 | B2 | 1/2005 | Nelson | 463/40 |
| 6,846,238 | B2 | 1/2005 | Wells | 463/39 |
| 6,887,151 | B2 | 5/2005 | Leen et al. | 463/16 |
| 6,923,724 | B2 | 8/2005 | Williams | 463/42 |
| 6,935,952 | B2 | 8/2005 | Walker et al. | 463/25 |
| 6,971,956 | B2 | 12/2005 | Rowe et al. | 463/25 |
| 7,331,868 | B2 | 2/2008 | Beaulieu et al. | 463/30 |
| 7,534,169 | B2 | 5/2009 | Amaitis et al. | 463/39 |
| 7,549,576 | B2 | 6/2009 | Alderucci et al. | 235/380 |
| 7,637,810 | B2 | 12/2009 | Amaitis et al. | 463/25 |
| 2002/0068631 | A1 | 6/2002 | Raverdy et al. | 463/42 |
| 2002/0086729 | A1 | 7/2002 | Emmerson et al. | 463/41 |
| 2002/0098888 | A1 | 7/2002 | Rowe et al. | 463/39 |
| 2002/0147047 | A1 | 10/2002 | Letovsky | 463/42 |
| 2002/0147049 | A1 | 10/2002 | Carter, Sr. | 463/42 |
| 2002/0151363 | A1 | 10/2002 | Letovsky et al. | 463/40 |
| 2002/0155887 | A1 | 10/2002 | Criss-Puszkiewicz et al. | 463/29 |
| 2002/0183107 | A1 | 12/2002 | Wolfe | 463/17 |
| 2003/0006931 | A1 | 1/2003 | Mages | 342/357.06 |
| 2003/0008703 | A1 | 1/2003 | Gauselmann | 463/20 |
| 2003/0032474 | A1 | 2/2003 | Kaminkow | 463/25 |
| 2003/0032485 | A1 | 2/2003 | Cockerille et al. | 463/43 |
| 2003/0054868 | A1 | 3/2003 | Paulsen et al. | 463/1 |
| 2003/0054878 | A1 | 3/2003 | Benoy et al. | 463/42 |
| 2003/0064805 | A1 * | 4/2003 | Wells | 463/39 |
| 2003/0104865 | A1 | 6/2003 | Itkis et al. | 463/40 |
| 2003/0130026 | A1 | 7/2003 | Breckner et al. | 463/20 |
| 2003/0139190 | A1 | 7/2003 | Steelberg et al. | 455/456 |
| 2003/0195841 | A1 | 10/2003 | Ginsberg et al. | 705/38 |
| 2003/0224855 | A1 | 12/2003 | Cunningham | 463/41 |
| 2003/0232651 | A1 | 12/2003 | Huard et al. | 463/42 |
| 2004/0087370 | A1 | 5/2004 | Tarantino | 463/42 |
| 2004/0137987 | A1 | 7/2004 | Nguyen et al. | 463/42 |
| 2004/0140989 | A1 | 7/2004 | Papageorge | 345/700 |
| 2004/0162124 | A1 | 8/2004 | Barton | 463/1 |
| 2004/0193431 | A1 | 9/2004 | Campbell | 705/1 |
| 2004/0224769 | A1 | 11/2004 | Hansen et al. | 463/40 |
| 2005/0003883 | A1 | 1/2005 | Muir et al. | 463/16 |
| 2005/0009600 | A1 | 1/2005 | Rowe et al. | 463/29 |
| 2005/0026697 | A1 | 2/2005 | Balahura et al. | 463/42 |
| 2005/0037708 | A1 | 2/2005 | Torvinen | 455/41.2 |
| 2005/0130728 | A1 | 6/2005 | Nguyen et al. | 463/16 |
| 2005/0187020 | A1 | 8/2005 | Amaitis et al. | 463/42 |
| 2005/0193209 | A1 | 9/2005 | Saunders et al. | 713/182 |
| 2005/0197190 | A1 | 9/2005 | Amaitis et al. | 463/42 |
| 2005/0227770 | A1 | 10/2005 | Papulov | 463/42 |
| 2005/0255919 | A1 * | 11/2005 | Nelson | 463/40 |
| 2006/0019745 | A1 | 1/2006 | Benbrahim | 463/29 |
| 2006/0035707 | A1 | 2/2006 | Nguyen et al. | 463/29 |
| 2006/0189382 | A1 | 8/2006 | Muir et al. | 463/29 |
| 2007/0021198 | A1 | 1/2007 | Muir et al. | 463/29 |
| 2007/0054739 | A1 | 3/2007 | Amaitis et al. | 463/42 |
| 2007/0060305 | A1 | 3/2007 | Amaitis et al. | 463/25 |
| 2007/0060306 | A1 | 3/2007 | Amaitis et al. | 463/25 |
| 2007/0060355 | A1 | 3/2007 | Amaitis et al. | 463/40 |
| 2007/0060358 | A1 | 3/2007 | Amaitis et al. | 463/42 |
| 2007/0066401 | A1 | 3/2007 | Amaitis et al. | 463/42 |
| 2007/0066402 | A1 | 3/2007 | Amaitis et al. | 463/42 |
| 2007/0275779 | A1 | 11/2007 | Amaitis et al. | |
| 2007/0281782 | A1 | 12/2007 | Amaitis et al. | |
| 2007/0281785 | A1 | 12/2007 | Amaitis et al. | |
| 2007/0281792 | A1 | 12/2007 | Amaitis et al. | |
| 2008/0300046 | A1 | 12/2008 | Gagner et al. | |
| 2008/0311994 | A1 | 12/2008 | Amaitis et al. | |
| 2009/0162245 | A1 | 6/2009 | Rasmussen | |
| 2009/0170596 | A1 | 7/2009 | Gagner et al. | |
| 2009/0170597 | A1 | 7/2009 | Bone et al. | |
| 2009/0176559 | A1 | 7/2009 | Buchholz et al. | |
| 2009/0280910 | A1 | 11/2009 | Gagner et al. | |
| 2010/0016075 | A1 | 1/2010 | Thomas | |

FOREIGN PATENT DOCUMENTS

| | | | | |
|---|---|---|---|---|
| WO | WO9634368 | A1 | 10/1996 | G07C 15/00 |
| WO | 01/54901 | A2 | 7/2001 | |
| WO | 02/078801 | A1 | 10/2002 | |
| WO | 02/101486 | A2 | 12/2002 | |
| WO | WO04000428 | A1 | 12/2003 | A63F 3/08 |
| WO | 2004/034223 | A2 | 4/2004 | |
| WO | WO2005035086 | A1 | 4/2005 | A63F 13/12 |
| WO | WO 2005/082011 | A2 | 9/2005 | |
| WO | WO2005086399 | A1 | 9/2005 | H04J 11/00 |
| WO | WO2007008713 | A2 | 1/2007 | A63F 13/00 |
| WO | WO2007022256 | A2 | 2/2007 | A63F 9/24 |

OTHER PUBLICATIONS

International Search Report corresponding to co-pending International Patent Application Serial No. PCT/US2007/012759, United States Patent Office, dated Oct. 15, 2008; (2 pages).

International Written Opinion corresponding to co-pending International Patent Application Serial No. PCT/US2007/012759, United States Patent Office, dated Oct. 15, 2008; (3 pages).

Third party submission in published application under 37 C.F.R., dated Apr. 25, 2013, 2 pages.

* cited by examiner

HANDHELD WAGERING GAME SYSTEM AND METHODS FOR CONDUCTING WAGERING GAMES THEREUPON

CLAIM OF PRIORITY AND CROSS-REFERENCE TO RELATED APPLICATIONS

This application is a Continuation of U.S. patent application Ser. No. 12/303,232, which was filed on Dec. 2, 2008, as a U.S. National Phase of International Application No. PCT/US2007/012759, which was filed on May 30, 2007, and claims the benefit of and priority to U.S. Provisional Patent Application No. 60/855,635, filed Oct. 31, 2006, and U.S. Provisional Patent Application No. 60/810,296, filed on Jun. 2, 2006, all of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to gaming machines, and methods for playing wagering games, and more particularly, to gaming systems utilizing a handheld gaming machine.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY

According to one aspect of the present disclosure, a gaming system for conducting a wagering game includes a handheld gaming machine configured to play at least one game and a controller. The controller is configured to base eligibility of the handheld gaming machine for a game-related feature at least upon a location of the handheld gaming machine and/or a proximity of the handheld gaming machine to an external device.

According to another aspect of the present disclosure, a gaming system for conducting a wagering game includes a handheld gaming machine configured to play at least one game and a controller. The controller is configured to base eligibility of the handheld gaming machine for game-related content and/or non-game content at least upon a location of the handheld gaming machine and/or a proximity of the handheld gaming machine to an external device.

According to another aspect of the disclosure, a method of conducting a wagering game on a gaming system comprises the acts of determining a location of a handheld gaming machine and basing an eligibility of the handheld gaming machine for a game-related feature and/or non-game related content at least upon the location.

According to yet another aspect of the disclosure, a computer readable storage medium is encoded with instructions for directing a gaming system to perform the above method.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 1(*b*) is a perspective view of a handheld gaming machine embodying the present disclosure;

DETAILED DESCRIPTION

Figure 1A:
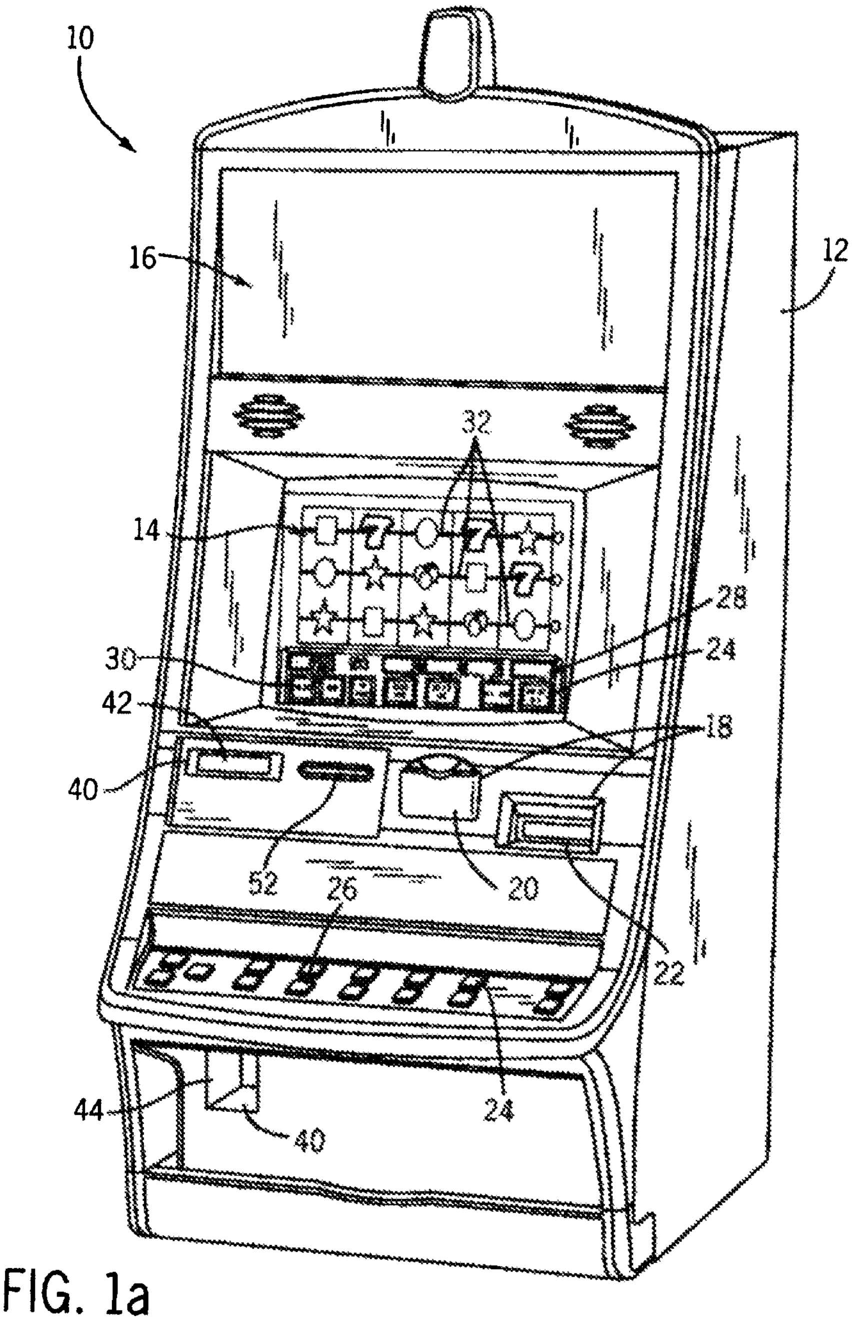
FIG. 1(*a*) is a perspective view of a free standing gaming machine embodying the present disclosure.

While this invention is susceptible of embodiment in many different forms, there is shown in the drawings and will herein be described in detail embodiments of the invention with the understanding that the present disclosure is to be considered as an exemplification of the principles of the invention and is not intended to limit the broad aspect of the invention to the embodiments illustrated.

Figure 1B:
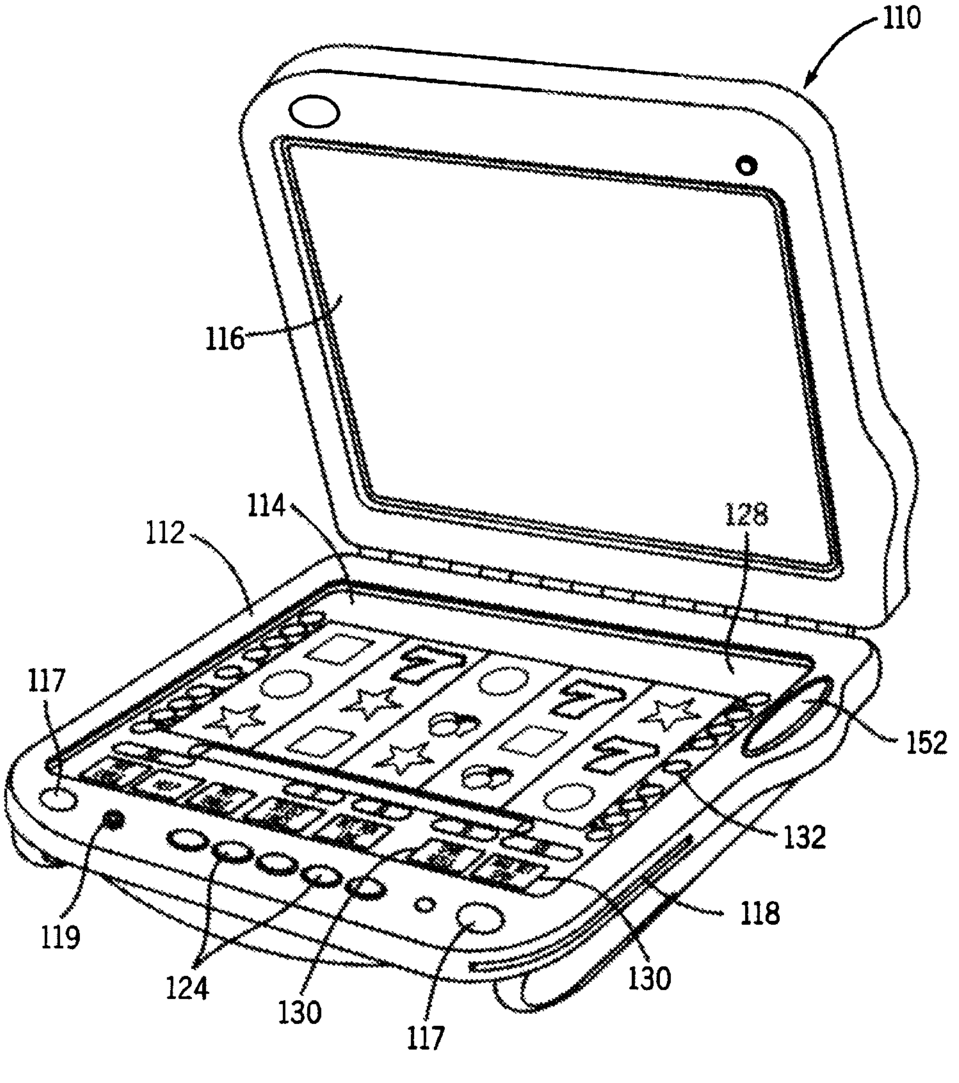

Referring to FIG. 1(*a*), a gaming machine 10 is used in gaming establishments such as casinos. With regard to the present disclosure, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1(*a*)). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1(*a*), or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1(*a*) as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Depicted in FIG. 1(*b*) is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1(*b*), the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1(*b*), or may be located outboard of the casing 112 and connected to the casing 112 via a variety of hard-wired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1(*b*), comprises a biometric sensing device.

Figure 2:
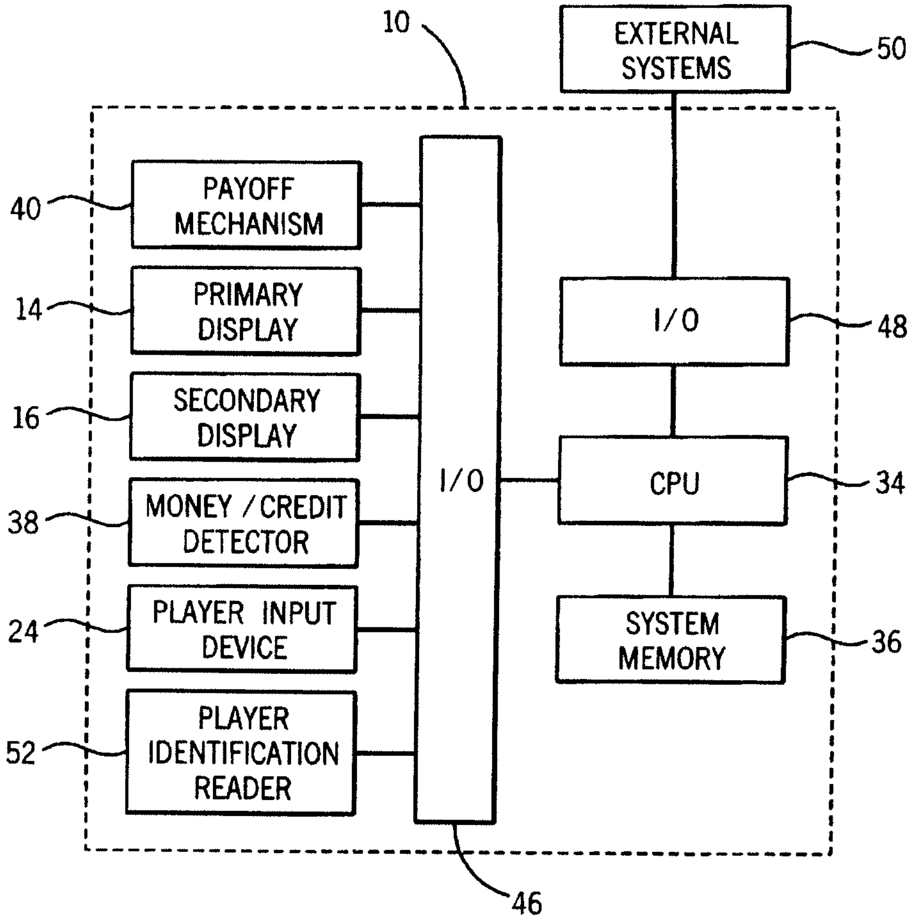
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1(*a*), the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

In accord with at least some aspects of the present concepts described below, a gaming system is provided comprising a handheld gaming machine 10 configured to play at least one game and a controller (e.g., 34). The controller 34 is configured to base eligibility of the handheld gaming machine 110 for a game-related feature upon a location of the handheld gaming machine and/or a proximity of the handheld gaming machine to an external device such as, but not limited to external systems 50 (e.g., gaming network, gaming server, communications hardware, another handheld gaming machine, etc.). A game-related feature, as used herein, comprises any game-related content including, but not limited to, complete wagering games or bonus games, portions of wagering games or bonus games (e.g., level(s), screen(s), color(s), color scheme, symbol(s), symbol set, and/or arrangement(s) of objects in games, pop-ups, instructions, icon(s), character(s), video sequence(s), animated sequence(s), image(s), sound(s), picture(s), music, song, message, etc.), outcomes, pay tables, awards, opportunities for awards, etcetera, singly or in combination, and/or computer-executable instruction sets relating thereto.

Turning now to FIG. 3(*a*), in at least some aspects of the present concepts, the game play experience is influenced by the location of the handheld gaming machine 110 and/or the proximity of the handheld gaming machine 110 to a particular location or device, such as a predefined zone, a hot spot (e.g., a wireless access point (WAP) or linked WAPS), a room in a casino, or another player's handheld gaming machine. As depicted in FIG. 3(*a*), a plurality of handheld gaming machines 110*a-f* is present in a room 210 of a gaming establishment. In at least some aspects, one or more transmitting/receiving nodes 200 connected to external systems 50 (e.g., gaming network, gaming server, communications hardware, etc.) are provided within room 210 to output signals (e.g., data bearing carrier signals) to the handheld gaming machines and/or receive signals from the handheld gaming machines. The transmitting/receiving node(s) 200 are alternatively disposed elsewhere within an effective communication range of the handheld gaming machines 110*a-f.*

Gaming establishments, in many instances, desire activity, noise, and excitement. Game designers have historically sought to create games imparting or fostering such activity, noise, and excitement through the use of visual effects, sounds, and game content. Handheld gaming machines 110 are, in isolation, more limited in what they are able to provide regarding visual effects and sounds, but are advantageously wirelessly linked to external systems 50 to provide such functionality. For example, a handheld gaming machine 110 is wirelessly linked to speakers, lights, displays, and/or other devices in the immediate vicinity of the handheld gaming machine.

FIG. 3(*b*) shows a representation of such a configuration. FIG. 3(*b*) shows a representation of a lounge chair 202 (or at a bar stool) in which a player may sit to play wagering games on the handheld gaming machine 110. Speakers 220 are built into the chair 220 or disposed adjacent the chair (or disposed about the bar seating area), respectively, to automatically activate responsive to a proximate handheld gaming machine 110 to enhance the players sensory experience when playing the wagering games. In this example, the speakers 220 themselves comprise transmitting/receiving nodes 200 (e.g., a Bluetooth-enabled device or the like) supporting short-range wireless communication, represented by dashed lines 225, between the speakers and the handheld gaming machine 110. In other aspects, such as represented in FIG. 3(*c*), an upright gaming machine 10 may advantageously comprise a transmitting/receiving node (not shown) to facilitate wireless communication with a handheld gaming machine 110. In FIG. 3(*c*), the wireless communication between the upright gaming machine 10 and the handheld gaming machine 110 is represented by dashed line 225.

In various aspects of the present concepts, the game play experience is influenced by the location of the handheld gaming machines 110. For example, a player may initially play blackjack on a handheld gaming machine 110 in an area that is configured to provide game play on the handheld gaming machine similar to that at a $1 table, but may later move the handheld gaming machine 110 into an area configured to provide game play on the handheld gaming machine similar to that at a $20 table.

As represented in the example of FIG. 3(*d*), a player using handheld gaming machine 110 may move (represented by the arrow) from a first room 210*a* to a second room 210*b* to change the game experience. The circles 250, shown as dashed lines, are provided to generally represent wireless coverage within the first room or area 210*a* and second room or area 210*b*, but are not intended to limit such wireless coverage to any particular topology. In at least some aspects of the present concepts, as the player moves from the first room 210*a* to the second room 210*b*, the location of the handheld gaming machine 110 is tracked (e.g., via a GPS system) and external systems 50 (e.g., gaming network, gaming server, communications hardware, etc.) automatically provide new inputs or alter the inputs to the handheld gaming machine 110 to change the gaming experience to suit the new location. In at least some other aspects of the present concepts, independent of any determination of a location of the handheld gaming machine, inputs to the handheld gaming machine (e.g., such as by transmitting/receiving nodes 200) change in accordance with the coverage of short-range wireless disposed within the second room or area to correspondingly influence the gaming experience. The change in the gaming experience may comprise any change. For example, the pay tables or denominations available to the handheld gaming machines 110 may be structured differently in different rooms or designated areas of the gaming establishments, similar to that conventionally employed, for example, in the arrangement of tables with different betting minimums (e.g., $1 table, $5 table, $20 table, etc. dispersed throughout a casino floor).

The gaming establishment may also provide a mobile hot spot. For example, a mobile hot spot kiosk or mobile base station may physically move around the gaming establishment to activate certain proximity-based objects, devices, and awards. Thus, the mobile hot spot kiosk or mobile base station may pass by the Men in Black upright gaming machines and may enable the Men in Black upright gaming machines to, for a predetermined time (e.g., two hours), drop content into handheld gaming machines 110. Handheld gaming machines 110 located within a sphere of influence of the mobile hot spot kiosk or mobile base station also may have some other features and content enabled that would not be enabled outside of the sphere of influence of the mobile hot spot kiosk or mobile base station. Thus, players may be motivated to actually follow or seek out such a mobile hot spot kiosk or mobile base station.

Alternatively, the mobile hot spot may be a virtual hot spot. Instead of physically moving a hot spot from one location to another physical location, the external systems 50 (e.g., gaming network, gaming server, etc.), wherever resident, may assign a hot spot to an upright gaming machine 10 (see, e.g., FIG. 3(*e*)), selected transmission/receiving node 200, or a selected handheld gaming machine 110 (see, e.g., FIG. 3(*f*)). FIG. 3(*e*) shows a an upright gaming machine 10 supporting a hot spot represented by circle 255. Handheld gaming machine 110*a* is shown to be positioned within the hot spot 255, whereas handheld gaming machine 110*b* is shown to be positioned outside of the hot spot. In one example, a handheld gaming machine 110 selected from an available plurality of handheld gaming machines is designated as a temporary hot spot. As shown by the representation of FIG. 3(*f*), all other handheld gaming machines 110*b-e* within the proximity (e.g., circle 260) of the selected handheld gaming machine 110*a* (i.e., within 5 feet, 10 feet, 50 feet), as determined by location determining devices (e.g., GPS, triangulation, etc.), or as limited by a broadcasting range (e.g., circle 260) of the associated wireless output device used to form the hot spot (e.g., short-range wireless connections) are within the hot spot associated with the selected handheld gaming machine.

In the example of FIG. 3(*f*), handheld gaming machines 110*f-h* are not in the proximity of the selected handheld gaming machine 110*a*.

When the mobile hot spot is associated with a handheld gaming machine (e.g., 110*a*), the hot spot will move with the selected handheld gaming machine. Following the lapse of time (e.g., 30 seconds, 1 minute, 5 minutes, etc.) or in accord with another precondition or setting, the external systems 50 then subsequently selects, or randomly or otherwise, another of the available handheld gaming machines to serve as a mobile hot spot. Optionally, selection as a hot spot may confer to the player bearing the selected handheld gaming machine (e.g., 110*a*) a separate benefit not conveyed to other handheld gaming machines (e.g., 110*b-e*) within the sphere of influence (e.g., circle 260) of the selected handheld gaming machine. The wireless infrastructure supporting the aforementioned aspects may comprise any network system and/or components enabling communication, as described, including, but not limited to, a mesh network.

Regarding the desire to create excitement, the handheld device 110 provides, perhaps, an even better platform for creating excitement than the traditional stand-alone wagering game machines 10. The handheld devices 110 may be utilized to encourage players to move throughout the gaming establishment and guide the players into desired locations. Thus, the handheld devices 110, in at least some aspects of the present concepts, are used by the gaming establishment to facilitate congregation of players in one area to create a stir in an environment. This is represented, for example, in FIG. 4(*a*), wherein a plurality of players having handheld gaming machines 110*a-n* are gathered together in front of an area display 300 within a predefined zone 305. In one aspect of a wagering game in accord with at least some of the present concepts, for example, players may be instructed to gather within a certain predetermined period of time (e.g., seconds, minutes, or hours) with other players having handheld gaming machines 110 of a predetermined color or affiliation wherein some benefit can be gained by achieving the goal. Players with red handheld gaming machines 110, for example, can all be instructed to seek out and gather around other players having red handheld gaming machines 110 within 5 minutes and, if at least 10 players get within a small area or a predefined room or location in the gaming establishment, all of the successful participants are provided an eligibility for a game, game related feature (e.g., game-related content), non-game related feature (e.g., non-game-related content), monetary award (e.g., 50 credits, 100 credits, 200 credits, etc.), non-monetary award (e.g., service, discount, etc.).

In one aspect, the player participants who have gathered, such as shown by way of example in FIG. 4(*a*), may be continually or periodically informed, through pop-up messages, text messages, or the like, of their progress and they may even be given hints of the location of remaining potential targets. For example, a congregation of nine players would be informed via pop-up message that they are still one player short of the ten players required to receive the award and that the nearest player meeting the predefined criteria (e.g., a specific color or affiliation of handheld) is located in an adjacent room or over at the bar and must join the group within 2 minutes. At this point, for a proximity-based game, the nine participants would work together to determine if time remains for one or more participants to find and retrieve the missing participant and bring him or her to the group or whether all of the participants should move, en masse, over to the bar to find the final participant. In this context, the location of each of the handheld gaming machines 110 is individually tracked to determined whether the handheld gaming machine is in the proximity of any other of the tracked handheld gaming machines. Thus, the handheld devices 110 can be used to work on individual and group emotions so that each player works to form a group and everyone in the group becomes emotionally vested in the activity, game or challenge being provided to them through their handheld device (or other source).

In another aspect of the present concepts, the movement of players and/or fostering of excitement could be brought about by conditioning benefits, awards, or the like, to the location of the handheld gaming machine 110 or to the proximity of the handheld gaming machine 110 to a specific device (e.g., external systems 50, such as a transmitter, receiver, transceiver, handheld gaming machine, etc.). For example, a group of friends are playing their handheld gaming machines 110 in a lounge. One of these players wins. That player may then be required to leave his friends in the lounge and go to a specially designated area to play a special bonus game. The eligibility for that special bonus game is thus conditioned on the location of that player's handheld gaming machine 110. If the player doesn't want to leave his friends and wants to opt-out of the special bonus game, he may instead receive a standard bonus game playable on the handheld gaming machine 110 possibly, but not necessarily, possessing lesser awards than the special bonus game. Continuing with the above-example, one player in the group of friends may be informed that, in 30 seconds, the 10 closest handheld gaming machines 110 to his handheld gaming machine 110 are going to play the bonus game with him. Each of the friends starts shouting to other people with whom they have become acquainted, or with whom they would like to become acquainted, to quickly come over to participate in the group bonus game. In this instance, the eligibility of the other handheld gaming machines 110 is proximity-based.

Another method to drive traffic to particular locations would be to selectively enable features on the handheld gaming machine 110 only upon the player's visiting certain areas of the gaming establishment. For example, if a player wanted to play certain wagering games, they are required, in at least some aspects, to actually walk over to the gaming terminals having the wagering game of interest and, based on the proximity of the handheld gaming machine 110 to the upright wagering game, the upright wagering game (e.g., Top Gun), or other source such as the external systems 50, transmits or drops a little content to the handheld gaming machine to enable the handheld gaming machine to then a related game or games (e.g., Top Gun poker or Top Gun mini-slots). This is achieved, in one aspect, via the wireless interface 225 shown in FIG. 3(*c*).

In still other aspects of the present concepts, the handheld gaming machine 110 could be selectively enabled to play a particular wagering game only when the handheld gaming machine is within a certain zone. For example, a handheld gaming machine 110 may be permitted to play a Big Event game only if the handheld gaming machine is located in a room or area dedicated to the Big Event game (see, e.g., FIG. 4(*a*)). In such room or area, the handheld gaming machine 110 would not be permitted to play any other game (e.g., poker). In yet other aspects, any game could be played in any of the areas of the gaming establishment and the game-play options are not artificially limited. Thus, players may optionally be required to move to a single location to experience a particular wagering game experience, such wagering game experience being configured to facilitate such participation by a plurality of, if not a multitude of, handheld gaming machines 110. For example, a particular area of the gaming establishment could be configured with signage and one or more large displays. As players reach certain milestones in their own personal wagering games (e.g., bonus games), their bonus game is broadcast, in at least some aspects, up on one of the large displays for all to witness. In at least some other aspects, players are grouped or directed toward particular displays to play a communal game. In still other aspects, a first player of a first handheld gaming machine 110 is playing a head-to-head competitive game against a second player of a second handheld gaming machine one the same display or on adjacent displays (e.g., the player achieving the highest bonus round award, the "winning" player receives an extra bonus award, which may optionally be funded in whole or in part from the "losing" player's total bonus award).

Another concept related to movement of players through the wagering establishment is a individual or group game wherein players are required to search and "find" various objects in the casino, akin to a treasure hunt or scavenger hunt. Such game may comprise a wagering game or a non-wagering activity (e.g., tying a nominal benefit to an introductory activity that would acquaint a person with the various areas and offerings of the gaming establishment). In association with a wagering game, at least one aspect of this concept requires a player to find, within a predetermined period of time (e.g., seconds, minutes, hours), one or more "objects" located within the casino. The objects could comprise anything, including, but not limited to, visible or obscured transmitters or stations, standup wagering games, casino employees, wagering game tables, other handheld gaming machines, other players, etc. For example, the handheld gaming machines 110 may comprise a camera positioned to take a digital image of the player and this picture may then be disseminated to all other handheld gaming machines (except the player whose picture was taken) and other players are then tasked to be the first one to find the player associated with the picture. An award is awarded to the first person to find and synchronize their handheld gaming machine to that of the pictured player. In another aspect, the handheld gaming machines 110 may comprise a camera positioned to take a digital image of a player's surroundings and a successive series of pictures may then be disseminated to all other handheld gaming machines (except the handheld machine taking the pictures) and other players are then tasked to be the first one to infer the location of the handheld machine taking the pictures from the pictures and then find and synchronize to the handheld machine taking the pictures. In still additional aspects, the external systems 50 (e.g., GPS) monitors the location of the handheld gaming machine 110 and/or vectors (e.g., direction of movement) and optionally provides location-based hints or clues.

The handheld gaming machine 110 may, in at least some aspects of the above search and find concepts, provide continuous or intermittent clues as to the whereabouts of the object(s) of the treasure hunt. As in some conventional bonus games, the "value" or credits awarded for each successive find are incrementally increased to heighten the player's sense of excitement. For example, in at least one aspect, the distance between objects increases with each successive find, so that to get the larger awards, the player has to move faster and faster to find the next successive object within a predetermined time limit. Opportunities may further be provided to the player to win or buy additional time.

In variations on the scavenger hunt concept, players are required to walk around from location to location and collect things or find people and collect things from certain casino staff. For example, a player may be required to actually meet an employee who gives the player a 5-minute instruction on how to play craps and then deposits a confirmation of the contact in the handheld gaming machine 110. Thus, both the gaming establishment and the player benefit from the interaction. In yet another variant, a player is required to play the upright version of a plurality of gaming machines to enable content on the handheld gaming machine 110. For example, in a scavenger hunt game, or in non-scavenger hunt wagering game enabling prerequisite acts, a player is required to play a predetermined minimum amount of money (e.g., $10) on each of one or more predetermined machines (e.g., Monopoly, Men in Black, Dirty Harry and Big Event). Upon play of the predetermined minimum amount at each of these upright machines, the upright machine (or other device) transmits to the handheld gaming machine 110 data (e.g., a "proof of play") that is accumulated. In a scavenger hunt aspect, when sufficient data has been accumulated, the player receives a corresponding award. As a non-scavenger hunt wagering game enabling prerequisite act, such acts may provide the combined data necessary to unlock a game or game feature (e.g., mobile versions of the predetermined games played) on the handheld gaming machine 110 and the player may be permitted to thereafter play such enabled games on the handheld gaming machine. Thus, the player is forced, in this aspect, to play the upright games to learn about the particular game and to experience the full features of the upright game prior to being enabled to play the mobile version of such wagering game.

Continuing with the above concepts, the upright gaming machine and the handheld gaming machine 110 communicate with one another, via a hardwired (e.g., docked) or wireless connection 225 (see, e.g., FIG. 3(*c*)) to exchange information (e.g., data). The upright gaming machine 10 could unlock content already on the handheld gaming machine 110, transmit a missing portion(s) of such content to provide a completely enabled game on the handheld gaming machine, and/or provide complete content to the handheld gaming machine. In other aspects, the handheld gaming machine 110 is configured to provide data and/or content to the upright gaming machine 10, which may, in at least some aspects, provide enhanced features, prompts, and/or outcomes on the upright gaming machine. In at least some aspects, a player is required to go to a plurality of lounges (e.g., a "Monopoly" mobile lounge and a "Men in Black" mobile lounge). When the player has visited each of the plurality of lounges, and optionally stayed in each of the plurality of lounges for a predetermined minimum period of time (e.g., 10 minutes, 20 minutes, etc.), new content is enabled on the handheld gaming machine 110 by the upright gaming machine 10 and/or the external systems 50. For example, a player not visiting the lounges would be constrained to play a mobile game having a limited subset of wagering game and/or bonus game options, whereas a player satisfying the criteria is permitted a greater variety of wagering game and/or bonus game options. Such features may optionally be time limited. In other words, any of the enabling features and/or aspects described herein may be inherently time limited so that a player of a handheld gaming machine 110 may be continually, or at least intermittently, be required to participate in games, features, or movement necessary to retain such features and content and/or to reacquire such features and content.

In yet other aspects, the handheld gaming machine 110 serves as a persistent state device. For example, a variety of upright gaming machines are provided with a "can't lose" symbol. When the "can't lose" symbol appears in a predetermined position (e.g., along an active payline), the symbol or the like is transmitted to the player's handheld gaming machine 110 (e.g., a "can't lose" counter is incremented by one). If the player accumulates a certain minimum number of these "can't lose" symbols, from a single upright machine or from a plurality of upright machines, the player or handheld gaming machine is then eligible for a new content, award, and/or experience. Thus, an upright gaming machine 10 is configured, in at least some aspects, to provide content and data, such as wins, outcomes, wagers, etc., to the handheld gaming machine 110 at least upon the completion of a task or goal and to optionally inform a player that they are to move on to the next task or goal. The data transmitted to the handheld gaming machine 110 may then be temporarily stored on the handheld gaming machine and/or uploaded to a network or permanent storage device associated with the external systems 50 for long-term storage. In this way, a player can return to the gaming establishment, a sister gaming establishment, or even an unrelated gaming establishment, and pick up where they left off, with all of the accrued benefits and advantages of their earlier play on the handheld gaming machine 110.

In still other aspects, random bonuses may also be awarded at randomly determined locations, selected from a plurality of available locations, within the gaming establishment. If a player's handheld gaming machine 110 happens to be located in the right location or zone at the right time, that player would win a bonus or would be permitted to play a bonus game.

As another example of a proximity-based game play in accord with aspects of the present concepts, a player's handheld gaming machine 110 is temporarily made "lucky." In one aspect, the player's odds are immediately improved, within permissible regulatory limits and within a predetermined time limit or a randomly selected time within a permissible range of time limits. For example, the "lucky" state may last for 1 minute, 5 minutes, 10 minutes, or any greater or lesser time period. In another aspect, not only are the player's odds improved, but other nearby handheld gaming machines 110 and similarly made "lucky," based on their proximity to the original "lucky" handheld gaming machine. For example, those handheld gaming machines 110 located within a predetermined distance (e.g., 5 feet, 10 feet) of the original "lucky" handheld gaming machine will be automatically rendered "lucky." This aspect may also be time-based. For example, the ability to transfer the "lucky" status may only exist for a predetermined and limited amount of time (e.g., less than 1 second, 1 second, 2 seconds, 5 seconds, 10 seconds, etc.). Optionally, each of the newly made "lucky" handheld gaming machines 110 is permitted to pass on the "lucky" status in the same manner as it was transferred to them from the original handheld "lucky" gaming machine. In this way, the opportunity exists to provide a large number of players of handheld gaming machines 110 with a chance to win or receive a random award and to generate tremendous excitement.

As shown by the representation of FIG. 3(*g*), a first handheld gaming machines 110*a* is temporarily made "lucky." A second handheld gaming machine 110*b* is within the proximity (e.g., 3 feet in this example) of the selected handheld gaming machine 110*a*, as determined by location determining devices (e.g., GPS, triangulation, etc.), or as limited by a broadcasting range of the associated wireless output device of handheld gaming machine 110*a*. Accordingly, the second handheld gaming machine 110*b* is temporarily made "lucky," the action being generally represented by the wireless signal 235. Other handheld gaming machines 110*c-g* are not within the proximity of the selected handheld gaming machine 110*a* and are not directly affected thereby. However, a third second handheld gaming machines 110*c* is within the proximity of the second handheld gaming machine 110*b*, now "lucky," and is therefore also temporarily made "lucky" by a wireless signal 235 from the second handheld gaming machine 110*b*. This chain is continued from handheld gaming machines 110*c* through to handheld gaming machines 110*d-e*. After handheld gaming machine 110*e* is made "lucky," no further handheld gaming machines (e.g., 110*f*-110*h*) are within range of handheld gaming machine 110*e*, so the chain terminates. In at least some aspects, the time period for which all of the "lucky" handheld gaming machines (e.g., 110*a-e*) retain such status is based on the original lucky handheld gaming machine 110*a*. In other words, when the predetermined time period for the "lucky" state expires for handheld gaming machine 110*a*, all of the other affected handheld gaming machines (e.g., 110*a-e*) simultaneously cease to enjoy such status. Although depicted in FIG. 4(*b*) as a handheld to handheld signal output 235, the "lucky" status may be conferred to each handheld gaming machine 110 through the external systems 50 based on a known location of each handheld gaming machine.

In other aspects, a player may be permitted to wager, using the handheld gaming machine 110, with (e.g., syndicate betting, group collaborative play, etc.) and/or against (e.g., group competitive play, etc.) other players in proximity to the player's handheld gaming machine. For example, as shown for example in FIG. 3(*a*), a player of handheld gaming machine 110*a* sits together in a room or area 210 to play video poker games with his or her friends, who are using handheld gaming machines 110*b-d*, respectively. In one aspect thereof, the handheld gaming machines 110*a-d* are linked together in a syndicate better arrangement as a single handheld gaming machine with one designated handheld gaming machine (e.g., 110*a*) designated to receive inputs and the remaining handheld gaming machines (e.g., 110*b-d*) designated to only serve a display function and/or receive non-wagering inputs until the handheld gaming machines are de-linked. In this aspect, a group of players may elect to designate one player, who may be the most skilled or best player at a particular game, and the remaining players in the group may input separate wagers on the play of the designated player. The outcomes achieved by the designated player would then be applied to the remaining players in the group. In one example, the display of the designated player's game play is displayed on an area display, signage 120, or a local display viewable by a small group of players. Optionally, these features are based on location rather than proximity.

In still another aspect, although not a wagering game, a handheld gaming machine may be configured to search for persons of compatible interests. A player may fill out a profile of interests and participate in an open sharing of information for notification and communication with other persons having handheld gaming machines having similar interests. In one respect, players could indicate their alma mater and favorite sports team. If another person on another handheld gaming machine 110 is from the same alma mater or has the same favorite sports team, the handheld gaming machine may install such people on the handheld gaming machine "buddy" list so the players may instant message or email one another. The players may optionally be provided with location, proximity, and/or affiliation information.

In still other variants, the handheld gaming machine 110 may be used in a relationship or dating capacity. Players having certain interests and desires may sign up with a dating service and, if there is a sufficient overlap or match of interests, the players are asked separately if they are interested in meeting the other player following a review of information provided by such person. Introductions could optionally be tiered following initiation of communication based on a successful match. Information provided at one stage and electronic images provided at another stage, etcetera. Thus, the handheld gaming machine 110 optionally serves as a match-making device. In at least some aspects, persons having compatible interests, however determined, are placed together as players in a cooperative game, preferably a team of two. For example, two players having compatible interests, one player in a House of Blue's club in a first gaming establishment and the other player in a House of Blue's club in a second gaming establishment, are placed together in a horse racing game wherein each of the two players has to work together with the other player to complete the race. The players are preferably linked together through an audio and/or visual connection (e.g., VOIP, LAN, WAN, etc.) so that they may communicate with another before, during, and/or after game play. The players are preferably, but not necessarily, given the option to continue or discontinue play with the other player at any time. For example, the players may be required to play with one another for a minimum period of time (e.g., 5 minutes) or for a minimum number of games (e.g., 3 games) before being allowed to discontinue play.

In still another variant on the dating or match-making concept, each interested player may opt-in to a profiling service and define a profile of themselves in their handheld gaming machine 110. This profile is made available to any other handheld gaming machine 110 within a certain radius (e.g., 3 feet, 5 feet, 10 feet, 20 feet, etc.) and, when another opt-in player having another handheld gaming machine 110 is within such radius, both opt-in players are notified that a person of interest is nearby. Each player is then provided with the profile of the other player. The profile optionally includes a picture of the player. In other aspects, a player's handheld gaming machine may automatically transmit or cause to be transmitted the player's profile may be sent to another proximate opt-in without the knowledge of the player of the transmitting handheld gaming machine 110. In this way, such player would not be cognizant of every rejection, but would rather only be aware of the other players, if any, that are interested in the player after having reviewed the player's profile. The transmission of the player's profile may alternatively be handled by an external transmitting device (i.e., not the player's handheld gaming machine 110) based on a known location of the handheld gaming machine 110 relative to the other handheld gaming machine. In at least some aspects, the player's ability to see other opt-in player's profiles may not be proximity-based and may instead comprise a browsable database or bulletin board to enable the opt-in players to make their own decisions about potential compatibility. The opt-in players may then directly contact another opt-in player through an audio and/or visual connection (e.g., VOIP, LAN, WAN, etc.). The browsable database or bulletin board may optionally disseminate general or specific location information.

In a similar concept, players are permitted to set preferences for game play so that they are matched up with players of similar skill and/or preferences. For example, in a poker game where a plurality of players are playing against the gaming establishment and/or against each other, an experienced player might not want to play with an inexperienced person that might commits errors adversely affecting the experienced player, so the experienced player may indicate a preference for experienced players (e.g., a level 5 or higher on a 10-point scale). The experienced player may also indicate a preference for tables having a higher denomination and higher betting limits. The external systems 50 (e.g., gaming network, gaming server, etc.) would then try to match the experienced player with a game meeting the player's requirements. If no suitable matches are found, the player will be informed that no suitable matches were found and would preferably display options of available games meeting one or more of the player's requirements for acceptance or rejection by the player.

A database of active players or players waiting in a queue to join a game is advantageously maintained to permit players and/or the game control system to match players having similar requirements. For example, a prospective poker player may search a list of on-line poker players (e.g., active players and players waiting to join a game) to look at player-profiles, consider entering one or more open games, and join a game or continue to wait. The prospective players may further be enabled to contact or text message other players to entice them to leave one game to join the prospective player in another game. For example, a prospective highly-experienced player, not satisfied with the options for play in the open games, may text message several other highly-experienced players from various active games to ask them if they would be interested in leaving their current games to join him in starting a new game. In at least some aspects, the players are linked together through an audio and/or visual connection (e.g., VOIP, LAN, WAN, etc.) so the players can communicate with one another regardless of physical location (e.g., in different areas or rooms, different casinos, etc.).

In at least some other aspects, a display and/or an area display (see, e.g., 300 in FIG. 4(*a*)) are disposed at one or more locations in the gaming establishment and the display(s) is/are configured to periodically (e.g., on the hour every hour) display a sweepstakes drawing (e.g., a Player's Club number, a player tracking number, a handheld gaming machine ID), or a raffle or lottery-type drawing (e.g., a mini-powerball drawing). The results could be displayed for a limited period of time (e.g., 5 minutes) with a countdown timer to the next drawing or the like (e.g., "50 minutes to the next drawing") to heighten anticipation. Various preconditions may optionally be imposed on the eligibility for the sweepstakes drawing or lottery-type drawing. For example, a player may only be rendered eligible if the player has actively wagered on the handheld gaming machine during a predetermined period of time and/or wagered a minimum threshold amount during such period of time. In at least some aspects, a meter may be provided on the handheld gaming machine display or other indicating device to inform the player as to whether they have, have not, or about to satisfy such eligibility prerequisites. The eligibility prerequisites may optionally vary according to a player's status (e.g., as a Player's Club member, a high roller, etc.) and/or location (e.g., proximity to a display, signage, or area where the winner is displayed or announced to ensure that the winner is present). In at least some aspects, the results of such drawings are optionally output to at least a display 114 of eligible handheld gaming machines 110.

One variation of syndicate play include "versus play" or competitive play. The handheld gaming machines 110 lend themselves to group play wherein the players often are acquainted with one another. For example, a group of guys are sitting around playing various wagering games on their handheld gaming machines 110 and they decide that they all want to play poker (e.g., Texas Hold 'Em). One gaming scheme in accord with the present concepts includes permitting a group of players to competitively play against each other. Although the house is not present in the conventional sense to regulate the play between the players, the group play is funded by a usage fee, entry fee, and/or a percentage of the winnings or wagers. Since the players are playing against each other, rather than the house, there is no danger to the house of cheating or collusion. In another aspect, a group of players may play in a game against the house, but to avoid the possibility of cheating or collusion, the network or game control system selects players randomly (e.g., from a queue), from across multiple properties, or based on the locations of the devices (e.g., the devices must be more than a predetermined distance, such as 20 feet or 100 feet, from one another). In an example of random selection, the gaming control system announces the formation of a game and invites all handheld gaming machine 110, or participating and/or eligible handheld gaming machines, to participate in a group game (e.g., a syndicate betting game). Those players being so notified then optionally enter into such group game and, when the group is full or other precondition (e.g., time) met, the group is closed and play of the group game proceeds. In another aspect, all persons desiring to a particular game (e.g., poker) could be required to play in a room dedicated to that particular game (e.g., a poker room).

In at least some aspects, a handheld gaming machine 110 may be used during a game to transfer data to another handheld gaming machine, as part of game play. For example, a wagering game may be specifically configured to permit a player of a first handheld gaming machine 110 to pass a card, a symbol, outcome, benefit, and/or credits to a player of a second handheld gaming machine. The first handheld gaming machine 110 and second handheld gaming machine may be located in the same area or may be distantly located from one another. In one example, the player of the first handheld gaming machine 110 passes a card to a player of the second handheld gaming machine and vice versa. In a game having four players, player one transfers a card to player two, who transfers a card to player three, who transfers a card to player four, who transfers a card to player one. All players could be required to select a card for transfer and then the transfers are subsequently simultaneously performed (e.g., "Anaconda"). In one aspect, this game could comprise a poker game variant commonly referred to as "pass the trash" wherein each player transfers one or more cards deemed "trash" by the player to another player. This transfer continues from player to player.

Due to the control and security afforded by the electronic environment, games may be developed involving the participation of multiple players that are not currently available in a casino environment. In various aspects, this type of wagering game would permit a first player to pass off the action in the game to another player in a defined group. For example, in a Russian roulette bonus game, each person who selects a selectable element that is not a bonus-ending outcome receives an award (e.g., 100 credits), and then they pass the bonus game off to the next player following a successful outcome (e.g., the select a selectable element associated with an award, not a bonus-ending outcome). The passing of the game would continue until a player "loses" by selecting a selectable element associated with the bonus-ending outcome.

In another aspect, multiple players may contribute to a selection or to an overall outcome in a game. For example, a group of players may selectively vote on available selection options with the majority of the votes used to select the corresponding selectable element or option. In another example, multiple players may be sequentially involved in a game. For example, a first player would make a selection of a selectable element or spin a reel or wheel and then pass it on to a second player, who would likewise make a selection of a selectable element or spin a reel or wheel and so on. Thus, five players could be selected to each spin one reel in a five reel wagering game, bonus game, or the like. In this way, a number of players are involved in the outcome.

In these and other aspects of the present concepts, in a group shared experience (e.g., a group game, a collaborative group game, a competitive group game, etc.), an outcome or result is optionally dependent upon at least an input of a first player on his or her handheld gaming machine 110 and upon an input of one of the other players in a group on their handheld gaming machine. For example, as noted above in one of the examples above, a player's outcome is determined in part by the player's passing of at least one card to another player and receipt of at least one card from another player. In another example, a first player picks a first of a plurality of selectable elements and a second player picks a remaining one of the plurality of selectable elements. This shared picking may continue through a predetermined number of players or until, for example, a selectable element associated with an end-picking trigger is selected. In still another example, a player's selection may comprise the player's location. For example, a player's outcome or result is dependent upon an input of another player, the input comprising the location of the other player's handheld gaming machine 110. Thus, the other player may be instructed to select a box by walking over to one of a plurality of boxes disposed about an area or a room and the proximity of the other player's handheld gaming machine 110 to an adjacent box, determined for example by GPS location at the expiration of a selection timer (e.g., after 15 or 30 seconds), synchronizing between the handheld gaming machine 110 and a device in or near the box, or the like. Thus, the present concepts include any game or non-game scenario where a player's individual outcome is dependent at least in part, on another person's input on their handheld gaming machine 110.

The handheld gaming machine 110 in accord with at least some of the present concepts are advantageously utilized to provide inputs to wagering games, bonus games, and/or progressive games in accord with the location of the handheld gaming machine 110 and/or the proximity of the handheld gaming machine 110 to another device (e.g., a receiver, a transceiver, a hot spot, another handheld gaming machine, etc.). Thus, for example, the spot on which the player is standing itself provides an input to a game. The location of the handheld gaming machine 110 may dictate or influence the player's gaming and non-gaming experiences.

In at least some aspects of the present concepts, eligibility of a player for a game or game-related feature, a non-game-related feature, and/or an award may be based on the presence of the handheld gaming machine 110 in a predetermined location. In other words, the eligibility of the player for a game or game-related feature, a non-game-related feature, and/or an award is based on the player moving to or walking by a predetermined location. Such eligibility may be conferred based on a single instance of the handheld gaming machine 110 being disposed in the predetermined location, or may be conferred and maintained only upon periodic instances of the handheld gaming machine being disposed in the predetermined location. Thus, the term "input" as used herein includes not only active inputs by a user of the handheld gaming machine 110, but may also include passive or non-user inputs by the handheld gaming machine to the external systems 50 (e.g., gaming network, gaming server, etc.).

In still other aspects of the present concepts, such as represented by FIG. 4(*d*), a progressive game usable in combination with the handheld gaming machines 110 defines a plurality of zones 405*a-d* within a progressive game room or area 410 of a gaming establishment. Each of the plurality of zones 405*a-d* has a different volatility. As shown in FIG. 4(*d*), the plurality of zones 405*a-d* are designated by markings on the floor, partitions, signage, colors or carpeting, or the like to provide a visual indication of the separate zones. Alternatively, the marking of the zones may be electronic, with each of the handheld gaming machines 110 being configured to automatically change background color, to display a map, or to provide another indicia of a zone, such as activation of an LED of a corresponding color or voice-prompt.

The progressive game, for example, comprises a first area 405*a* having a low volatility and offering a $100 progressive award, a second area 405*b* having a low-medium volatility and offering a $1,000 progressive award, a third area 405*c* having a medium-high volatility and offering a $10,000 progressive award, and a fourth area 405*d* having a high volatility and offering a $10,000 progressive award. The volatility is generally inversely proportional to the probability of winning the corresponding progressive. A player may select the progressive game in which they want to participate by simply walking over to the designated area corresponding to such progressive game. Thus, players wishing to participate in the low volatility progressive game may walk over to the first area 405*a* (e.g., a "green area") and begin playing, as represented in FIG. 4(*d*) by handheld gaming machines 110*a-l*. The areas are denoted, in at least some aspects, by appropriate visual sensory clues such as, but not limited to, colored carpeted, signage, signs, and/or a green background or indicia on the handheld gaming machine.

In FIG. 4(*d*), players in the low-medium volatility area 405*b* are represented by handheld gaming machines 110*m-n*. Player in the medium-high volatility area 405*c* and high volatility area 405*d* are respectively represented in FIG. 4(*d*) by handheld gaming machines 110*o* and 110*p*. If a player in one area (e.g., player of handheld gaming machine 110*a* in first area 405*a*) later wishes to participate in the high volatility progressive game, he or she can walk over to the fourth area 405*d* (e.g., a "red area") to begin play in the high volatility progressive game.

The handheld gaming machines 110 are advantageously utilizable in combination with any type of progressive game. In one example, a mystery progressive game is provided wherein a random number is selected within a designated range for the progressive game award values. Thus, for a mystery progressive game having a range of progressive game award values between $500 and $1000, the external systems 50 (e.g., gaming network, gaming server, etc.) randomly selects a mystery (i.e., concealed) progressive game award value therebetween, such as $802. The player's handheld gaming machine 110 that pushes the progressive game award value from $801 to $802 wins the mystery progressive game award of $802 and causes the external systems 50 randomly select another value for the mystery progressive game award value.

In another aspect of the present concepts, a bonus game includes a feature wherein a player must make a selection between a plurality of selectable elements. Instead of the conventional scheme wherein a player simply selects a selectable element from a touch screen display or the like, a player with a handheld gaming machine 110 is permitted and/or required to physically move to a designated one of a plurality of locations 400*a-d* corresponding to the plurality of selectable elements, such as is shown in FIG. 4(*c*). For example, if a player in a game is provided a key and is required to put the key in one of four locks (e.g., selectable elements), the player selects a lock by moving to an area (e.g., 400*a-d*) corresponding to a selected one of the selectable elements. The areas associated with each of the selectable elements may be denoted by any physical and/or electronic device including, but not limited to, signage, partitions, electronic signals or markers, lights, visually distinctive markings or colors on the floor or walls, separate rooms, or the like. The locations 400*a-d*, for example, each comprises signage 402*a-d* showing an image corresponding to an associated selectable element (e.g., different keys). As shown in FIG. 3(*c*), the player of handheld gaming machine 110*a* is moving in the direction of the arrow to occupy area 400*a*, whereas player of handheld gaming machine 110*e* is moving in the direction of the arrow to occupy area 400*b*.

The wagering games associated with the selections and selectable elements or areas of FIG. 4(*c*) may be individual games independent of one another or shared-experience games. Thus, in the depicted example of FIG. 4(*c*), the wagering game may comprise a group game where a bunch of players are grouped as teams. A representative of a first team of handheld gaming machines 110*a-d* is permitted to make a selection between the plurality of selectable elements, and a representative of a second team of handheld gaming machines 110*e-h* is permitted to make a selection between the same or another of the plurality of selectable elements. The representatives, namely handheld gaming machines 110*a* and 110*e*, select a desired selectable element, areas 400*a-b*, respectively, by moving to stand in the areas corresponding to the desired selectable element. Although the selectable element and areas 400*a-d* are generally denoted as having separate identifies in the present example, the areas themselves may comprise the selectable elements. For example, the areas 400*a-d* could each comprise a colored region (e.g., red, blue, green, and yellow circles or platforms) and the players would be required to select a colored circle or platform by standing upon such area. The players' input could be registered in any manner including, but not limited to, a lapse of a designated selection time (e.g., a 30 second countdown), an input by the player to the handheld gaming machine 110 (e.g., pressing an enter or select key), and/or the combination of a designated selection time and an input by the player.

Although the example of FIG. 4(*c*) shows two teams of players in one room or area 410, any number of teams and players may be involved in any of the examples of game play herein. Moreover, in accord with at least some aspects of shared-experience games, the teams and players are location in different locations within the gaming establishment, at a different site of a related gaming establishment, at a different gaming establishment, or at some other location not listed above.

These concepts are not limited to selection between a small number of options (e.g., two to five selectable elements). Instead, the present concepts advantageously lend themselves to larger than life game experiences wherein an entire room may be fashioned to resemble a game and/or a bonus screen. In some aspects, the configuration of the room or area may be static. For example, a room configured to represent the bonus or progressive game in JACKPOT PARTY may comprise selectable elements (i.e., presents) substantially statically replicated visually on the floor of a JACKPOT PARTY room, such as by stickers, mats, carpeting, or the like. Alternatively, in combination with embedded monitors in the floor (or walls), projected images onto the floor (or walls), or the like, an area or room may be configured to dynamically represent any one of a number of different games, themed (e.g., related to one another) or otherwise (e.g., different games not related to one another).

For example, a room may be configured to represent the bonus or progressive game in JACKPOT PARTY and the selectable elements (i.e., presents) are dynamically replicated visually on the floor of a JACKPOT PARTY room using such embedded video displays or projected images. In accord with such aspects, a player having a handheld gaming machine 110 is enabled to make a selection of a particular selectable element (i.e., a present depicted on the floor) by standing on top of one of the areas designated by a selectable element and pressing an enter or select key on the handheld gaming machine to confirm the selection of the selectable element. At least upon pressing the enter or select key, the location of the handheld gaming machine 110 would be determined and associated with the selected selectable element. Alternatively, a selection may be made by the lapse of a selection timer. For example, a player may be provided a predetermined amount of time to select a selectable element and, following the lapse of the timer, the location of the handheld gaming machine is determined and associated with a corresponding one of the selectable elements.

In another example, the floor of a room or area may comprise a giant MONOPOLY game board and the players physically walk around the squares of the MONOPOLY game board in accordance with the output of the handheld gaming machine 110. Eligibility for the subsequent turn and/or assignment of awards to the player is, in at least some aspects, conditioned upon the correct location of the handheld gaming machine 110 relative to the assigned square (i.e., the player must move to the correct square). Prompts or instructions are optionally provided to players who are not in the proper location within a predetermined period of time or who remain stationary at an incorrect square.

In the above JACKPOT PARTY and MONOPOLY examples, the handheld gaming machine 110 need not even comprise a display 114 in view of the video displays in the floor and/or projected images to convey information to a player. Thus, in accord with at least certain aspects of the present concepts, the handheld gaming machine 110 does not require a display and may utilized in combination with external displays and/or output devices to convey information to a player.

In general, the above examples represent interaction between a player's handheld gaming machine 110 and the player's environment to affect game play. As an additional example, a room or area in the gaming establishment is provided with a plurality of chairs, each chair having one of a predetermined plurality of colors (e.g., red, green, blue, yellow) and optionally comprising a docking station or cradle for the handheld gaming machines 110. A factor in determining which bonus or Big Event for which the player comprises, in at least one aspect, the color of the chair in which the player is sitting. Thus, the color of the chairs or generally, the player's physical environment, is incorporated directly into the overall gaming (and optionally non-gaming) experience.

The location of the handheld gaming machine 110 is determined by a wireless interface (e.g., a GPS system, a Bluetooth connection, RF triangulation, trilateration, etc.) or by plugging the handheld gaming machine 110 into a hardwired interface (e.g., a cradle at the chair). In one aspect, a large number of short range transmitting/receiving nodes are provided to provide coverage over a large area. The short range transmitting/receiving nodes may comprise, but are not limited to, Bluetooth devices (e.g., transmitter, receiver, transceiver, etc.). The interaction between the handheld gaming machine 110 and one or more of the short range transmitting/receiving nodes, via RF signals, is used to determine the transmitting/receiving node closest to the handheld gaming machine. Thus, a large room may be provided with 15 separate transmitting/receiving nodes, in effect providing 15 small hot spots, and the handheld gaming machine 110 would lock into the closest of the transmitting/receiving nodes. The handheld gaming machine 110 is preferably, but not necessarily, configured to display the determined location of the handheld gaming machine. For example, when a player approaches a "red" transmitting/receiving node from a "green" transmitting/receiving node the player's handheld gaming machine would display a color and/or text and/or other indicia representing the movement from the red to the green hot spot (e.g., transmitting/receiving node). The number of transmitting/receiving nodes, signal strengths, and/or device sensitivity may be freely varied to increase the sensitivity of the system to enhance the ability of the external systems 50 (e.g., gaming network, gaming server, etc.) to accurately locate the handheld gaming machine 110.

The location upon which eligibility may be based, in whole or in part, need not be limited vertically and could comprise a vertical and/or a horizontal aspect. For example, a wagering game associated with handheld gaming machines 110 may comprise a level picking bonus wherein, as a player satisfies the conditions to move to the next level, the player is prompted to physically move to another level of a room having a plurality of vertically arranged areas. Thus, a room may have two or more levels connected by ramps, stairs, bridges, escalators, elevators, or the like. As the players succeed in the game, they are permitted to move up to higher levels.

In accord with other aspects of the present concepts, the eligibility of the handheld device for a game-related feature, non-game-related feature, and/or award is made contingent not upon a location or proximity of the handheld gaming machine 110 to another device, but upon an affiliation of the handheld gaming machine. In accord with some aspects thereof, the eligibility of the handheld device for a game-related feature, non-game-related feature, and/or award is made contingent upon both location and proximity of the handheld gaming machine 110 to another device and an affiliation of the handheld gaming machine. Affiliation, as used herein, refers to the association of the handheld gaming machine 110 to one of a plurality of selectable elements prior to game play. The selectable elements may include, but are not limited to, a sporting event, a sports team, a color, a state, a city, a college, a game, a group, or the like. The affiliation may be selected by a player, assigned by another player, or assigned or randomly assigned by a controller (e.g., 34) and/or external systems 50 (e.g., gaming network, gaming server, etc.). The affiliations are utilizable as a separate trigger conveying eligibility for a game-related feature, non-game-related feature, and/or award.

For example, a player, upon receiving a handheld gaming machine 110, may enter a sweepstakes event or Big Event (via a wager or fee) or a prize draw event (no wager or fee required) having a baseball theme by selecting an affiliation with a favorite baseball team (e.g., the Chicago White Sox) from among a plurality of baseball teams. Regardless of the location of the handheld gaming machine 110 within the gaming establishment, the selection of the player or group of players affiliating their handheld gaming machines with the winning sweepstakes, Big Event, or prize draw group, here the Chicago White Sox, wins an award or prize.

The affiliation is optionally visually conspicuous, so that other players may readily determine a players affiliation. For example, a player may opt to affiliate his or her handheld gaming machine 110 with a red team and a portion of the display 114 or an indicator light turns red, or the handheld gaming machine 110 broadcasts to nearby handheld gaming machines the affiliation of the handheld gaming machine with the red team. In a sportsbook situation, such as is described below, for example, the colors may represent the color(s) of the team on which the player is wagering. This coloration would then inform nearby players as to the player's favored team.

Affiliation, as used herein, may also apply to an affiliation with the gaming establishment. For example, the affiliation may be a player's achievement of a certain status within the gaming establishment's player's club or rewards club. The affiliation may convey eligibility of the handheld gaming machine 110 for a game-related feature, non-game-related feature, and/or award based on the location or proximity of the handheld gaming machine 110 relative to another device (e.g., other handheld gaming machine, transceiver, receiver, etc.) and/or to the noted affiliation or to a specific level within such affiliation (e.g., silver, gold, platinum, diamond, etc.). Thus, a player may not be permitted to utilize the handheld gaming machine 110 within a particular area, such as a red lounge, unless the player is, for example, a Harrah's Awards Premiere player. Specific VIP rooms may be reserved for special players and, in such rooms (e.g., a diamond lounge) the games may be configured to pay out a higher percentage. Thus, in accord with at least some aspects of the present concepts, the location itself might confer and/or regulate eligibility. The location eligibility may further be based on factors such as, but not limited to, the redemption of player comps and/or game experience (e.g., a player's cumulative game time on a particular game or family of games).

The affiliation, in some respects, is permitted to override other lesser aspects or lower-tiered controls. For example, a player having a high roller affiliation is permitted to play as a high roller anywhere in the casino, rather than only in a high roller room. In other words, the player's affiliation controls, for example, the pay table, game percentages and/or betting rules, no matter where the player may be situated, just as if the player were playing in the conventional high roller room. This affiliation would advantageously override other protocols or limitations that might be selectively imposed in certain areas of the gaming establishment. In other words, if a MONOPOLY lounge is ordinarily configured to permit players to only play MONOPOLY themed games, the player's affiliation as a high roller may be permitted to override that restriction and permit the player to play whatever he or she pleases in that lounge. Moreover, the handheld gaming machine 110 may be tracked, as noted elsewhere herein, so that gaming establishment employees can attend to the high roller player as if he or she were in the high roller room. In this manner, a player's movements are not restricted.

In at least some aspects, the location of the handheld gaming machine 110 may be distributed to, for example, the external systems 50 (e.g., gaming network, gaming server, etc.), casino service employees (e.g., waitresses, attendants, managers, etc.), casino security systems and/or personnel, persons designated by the player (e.g., friends, spouse, etc.), persons sharing an affiliation with the player, other players sharing a game feature, non-game feature, or award in a shared experience with such handheld gaming machine, or general dissemination to all possible recipients, inclusive of all handheld gaming machines. Optionally, a player may be provided an option to disable the tracking of the handheld gaming machine 110 to certain selected non-essential recipients. Non-essential recipients (e.g., casino service employees, persons designated by the player, and persons sharing an affiliation with the player) may optionally be provided with a general location (e.g., at a room level) of the handheld gaming machine 110 rather than a specific location (e.g., a specific location within a room), to provide some degree of anonymity. Essential recipients would include, for example, the external systems 50 and casino security systems and/or personnel. Other handheld gaming machines 110 may be essential recipients or non-essential recipients, for example, depending upon the particular shared experience.

As one example, a high roller physically playing in a high roller room in an area configured to provide a $100 blackjack table experience may decide to undock her hand held device 110 and go have a drink in a MONOPOLY lounge. Concurrent with the arrival of the high roller in the MONOPOLY lounge, the game control system, casino service employees, casino security systems and/or personnel, persons designated by the player, persons sharing an affiliation with the player, and possibly all handheld gaming machines in the MONOPOLY lounge may be informed of the high roller's presence and/or location, absent de-selection of various non-essential recipients of such location information. In this way, the bartender or waitress in the MONOPOLY lounge may be immediately informed of the presence of the high roller.

The handheld gaming machine 110 is also optionally configurable with a "call button," akin to that in airlines, to call for assistance from a casino service employee. The call button may be a physical button or a button on a display (e.g., a touch screen display or touch screen haptic display) and a plurality of such buttons are optionally provided to enable a call for assistance from specific types of casino service employees. In many instances, a player may simply want to request a drink, whereas in other instances a player may wish to call a gaming supervisor or attendant, for example.

Any variety of shared-gaming experiences may be implemented in combination with the handheld gaming machine 110.

In at least one aspect, a handheld gaming machine 110 status level may be conferred to one or more (e.g., all) players having handheld gaming machines 110, or even at upright gaming machines, at a lesser status level within a predetermined range, with a designated or randomly determined affiliation, and/or for a designated or randomly determined time. For example, a first player is a status level five, which renders the first player eligible for wagering games, bonus games, bonus game features, and/or awards not available to other players of status levels below status level five. Second through sixth players are all playing handheld gaming machines near the first player and each of these players have status levels lower than status level five. The external systems 50 (e.g., gaming network, gaming server, etc.) may, randomly or responsive to a trigger, confer the status level of the first player's handheld gaming machine (status level five) to the second through sixth players handheld gaming machines 110 for a 10-minute period. Thus, the second through sixth players are automatically eligible (for a limited time) for wagering games, bonus games, bonus game features, and/or awards for which they were not previously eligible. The first player is optionally informed of their status as the benefactor of other players and optionally the benefited players are optionally informed of the location, vicinity, screen name, and/or identity of their benefactor. The shared experience, therefore, need not be related to a game in which each of the players are collectively and directly participating with one another, such as in a competitive or cooperative gaming experience, but may rather include any other shared experience.

In another aspect, each handheld gaming machine 110 is provided with a meter on the display 114 or elsewhere on the handheld gaming machine. The meter increases in magnitude or charges-up in response to a rate of coin-in (i.e., wagering), a minimum wager across a minimum number of pay lines, a rate of winning outcomes, achieving a winning outcome, attainment of a threshold award within a predetermined period of time, and/or combinations thereof. Once the meter reaches a certain level (e.g., 5 out of 5 bars), the player of the handheld gaming machine 110 is conferred some benefit such as, but not limited to, a pay back increase of 4% above the standard for a predetermined period of time (e.g., 10 minutes). This metered feature may optionally be transformed into a shared experience by extending the benefit to one or more other handheld gaming machines (and/or upright gaming machines). The handheld gaming machines 110 are selected, in accord with at least some aspects, based on a proximity of the machines to the handheld gaming machines 110 from which the benefit arises. In one example, the benefit is conveyed to all handhelds within five feet or ten feet. In another example, the benefit is conveyed to a predetermined number of the closest handheld gaming machines, such as the five or ten closest handheld gaming machines, regardless of distance. Thus, when one player is doing extremely well, other players may optionally benefit to contribute to the overall excitement of the group.

In accord with at least some aspects of the preceding examples, the requirements or preconditions to increase the level of the meter from an existing level to a successive level (e.g., adding a bar on the meter) are varied or tiered to make each successive tier more difficult and/or costly to attain than the preceding tier. This tiered progression may continue unabated through each of successive tiers or may be constant across one or more tiers. For example, a first and second tier may be related to the same preconditions, a third and a fourth tier may be related to a set of preconditions more difficult and/or costly than that of the first and second tier, and a fifth tier may be related to a set of preconditions more difficult and/or costly than any of the preceding tiers.

For example, a first tier may be obtained by a first set of preconditions such as, but not limited to, a minimum wager (e.g., 1 credit), a minimum wager across a minimum number of pay lines (e.g., 1 pay line), a rate of winning outcomes (e.g., 2 wins of any type within a predetermined period of time), achieving a predetermined winning outcome (e.g., 3 of a kind), attainment of a threshold award within a predetermined period of time (e.g., a win of 50 or more credits), and/or combinations thereof. This progression of increasing difficulty optionally continues, to varying degrees, through each of successive tiers. For example, in least one aspect, the tiered progression requires a minimum wager of ten times the number of bars to be obtained (e.g., 10 credits for the first tier to 50 credits for the fifth tier). Thus, for a player to achieve the higher tiers, greater and greater amounts of coin-in are required. In this manner, the player is also informed, continually or periodically, of their progress in achieving the next tier. Optionally, the player's tier(s) sequentially lapse upon the occurrence of other preconditions (e.g., lack of sustained play, lack of wins within a predetermined period of time, inadequate coin-in, etc.).

Although the above examples have referred to the meter as being tied to a specific handheld gaming machine 110 and an individual player, the meter may reflect a collective or shared effort by a plurality of players. Optionally, such meter may also be replicated on signage or an area display. Thus, a group of players may work together to achieve the preconditions necessary to advance to, for example, a final tier of a multi-tier set of preconditions to achieve a benefit conveyed thereby. Moreover, a plurality of groups or teams may competitively play against each other to be the first group or team to achieve the final tier following a predetermined start time and/or within a predetermined period of time. Such competitions may convey additional benefits to the winning team, but need not necessary diminish any benefits that may be associated with the attainment of the final tier. Accordingly, consistent with other examples provided herein, opportunities abound for utilization of the handheld gaming machines 110 to increase socialization, movement, and/or interaction between players.

In one example of shared-experience game play, a mystery progressive award, or other type of award or benefit in a game involving a plurality of players (e.g., a raffle prize, a sweepstakes award), may be randomly rotated or hop from eligible handheld gaming machine 110 to eligible handheld gaming machine until it terminates at a handheld gaming machine associated by the external systems 50 (e.g., gaming network, gaming server, etc.) to the award or benefit. Thus, the award or benefit would be passed like a "hot potato" amongst a plurality of eligible handheld gaming machines 110. When the potential benefit "lands on" an eligible handheld gaming machine 110, the player may see a representation such as an unopened present with a countdown timer. At the expiration of the timer, the present may either open to reveal the benefit if the handheld gaming machine 110 has been designated as the winner, or the present may be depicted as being passed on to another eligible handheld gaming machine (e.g., the present sprouts wings and flies away). Alternatively, a plurality of eligible handheld gaming machines 110 could "light up" and after successive predetermined periods of time (e.g., a few seconds), each of the eligible handheld gaming machines is successively dropped and dims to a default level until the winning handheld gaming machine is revealed (i.e., as the last one lit). Thus, in lieu of simply awarding the award or benefit to the winning player, a number of other eligible handheld gaming machines 110 are included in the build-up to the announcement of the winner to enhance the expectation and excitement.

Still another aspect of a shared-experience includes a "musical chairs" game wherein a visual and/or audio cue, displayed on a plurality of handheld gaming machines 110 and/or an area display or signage, is suddenly terminated, at which point each participant in the game presses a button to avoid elimination and advance to the next round. In another example, a shared experience includes a splatter effect for an award. In one aspect, the location of a handheld gaming machine 110 receiving a specified award or type of award is determined and players of handheld gaming machines 110 located near the winning handheld gaming machine receive lesser awards based on their proximity to the winning handheld gaming machine. The closer the other handheld gaming machines 110 are to the winning handheld gaming machine, the greater the award conveyed thereto. Thus, handheld gaming machines 110 within 5 feet of the winning handheld gaming machine receive 25% of the award received by the winning handheld gaming machine, handheld gaming machine between 5-10 feet of the winning handheld gaming machine receive 10% of the award, and handheld gaming machine between 10-15 feet of the winning handheld gaming machine receive 5% of the award. This award may alternatively be a randomly triggered event associated with a randomly selected or predetermined location in a room or area of the gaming establishment and the winning handheld gaming machine need not actually trigger the award. These aspects may be combined with other concepts disclosed herein. For example, a splatter effect may be incorporated into the award of a mystery progressive or a sweepstakes or raffle drawing, to benefit a greater number of players and to increase excitement.

In still another type of shared game experience, a wagering-based game is provided which is fashioned after popular massively multiplayer online games (MMOG's), such as Warcraft, or multiplayer online games (MPOG's), such as Quake or Halo, wherein a plurality of players are all connected together in a shared gaming environment. In this shared gaming environment, players may collect objects conveying some benefit to the player in the shared gaming environment, collect information which might benefit the player and/or other players, collect experience which increases a level, powers or abilities of the player, or the like. Players are advantageously permitted to freely trade objects, information, experience, characters, and/or services, or the like, with one another within this shared gaming environment. Alternatively, players may be permitted to barter or trade objects, information, experience, characters, and/or services, or the like, in the shared gaming environment for money, credits, and/or services in the real world.

In yet other aspects of trading or bartering in accord with the present concepts, a database or forum may be available to players of handheld gaming machines 110, or even kiosks or upright gaming machines, to trade game-related or non-game related assets. For example, a player receives a perk, comp, or prize of a pair of tickets to see a show, but does not want to see the show because they might have already seen the show or they might not want to see the show. Instead of simply giving away the tickets or throwing the tickets away, the player is instead permitted to trade it for something worth more to the player. The player is permitted to trade the tickets, in this example, by accessing a trading database to see if anyone is looking specifically for those tickets or looking for tickets to something in general. The player may alternatively post the tickets as being up for trade to inform other persons accessing the database that the tickets are available. Such posting may optionally disclose a specified minimum desired compensation. Players desiring a particular perk, comp, prize, or the like (e.g., such as the tickets noted above) may configure their handheld gaming machine 110 to automatically and immediately notify them if the desired item, such ash the tickets, are posted as being available for trade. Significantly, a player may even trade or barter an eligibility for a game, game feature, non-game feature, award, etc., within any time constraints that might naturally limit such transfer or within any arbitrary time limit provided to specifically enable and facilitate such transfers. Players desiring eligibility for a game, game feature, non-game feature, award, etc., may configure their handheld gaming machine 110 to automatically and immediately inform them of the desired eligibility and/or benefit.

To facilitate responsible gaming, in addition to placing monetary and/or time limits on a player's wagering, a player may be required to physically move from one location to another location. This may be combined with other disclosed aspects, such as the aforementioned sweepstakes or raffle drawing. Thus, in combination with the desire to promote responsible gaming, a player may be required to move through the gaming establishment to a predetermined spot (e.g., a sweepstakes drawing location). The action of moving from one area of the gaming establishment to another area of the gaming establishment may itself renew a player's eligibility for continued gaming and may optionally confer additional benefits. For example, in one aspect, a player is rendered eligible to participate in a PowerBall drawing for a predetermined period of time (e.g., 10 minutes, 1 hour, etc.) after the player's handheld gaming machine 110 was determined to be present in a room or area associated with the PowerBall drawing. If the player later returns to that room or area, the player's eligibility to participate in the next PowerBall drawing is renewed. In an example of another aspect, a player nearing or reaching a predetermined responsible gaming limit is informed of the wagering limitation imposed or likely to be imposed (e.g., a 15 minute waiting period) and is notified that, should he or she go over to a specified area, such as a Clint Eastwood area, specified benefits (e.g., eligibility for a prize award drawing or eligibility for a game) will be conveyed to the player's handheld gaming machine 110. Again, this prompts movement of the player, which promotes, in the intervening time, opportunity for reflection.

In still other aspects of the present concepts, the handheld gaming machines 110 are advantageously utilized in combination with real-time sports wagering, conventionally referred to as sportsbook or variants thereof.

In conventional sportsbooks, players wager on the ultimate outcome of the sporting event and/or point spreads between the winner and loser for sporting events including, but not limited to, football, basketball, hockey, soccer, tennis, horse racing, or boxing. In accord with the present aspects, players utilizing the handheld gaming machines 110 are permitted to wager on any aspect of a sporting event in real time. A player may wager on any aspect of play of the sporting competition including, but not limited to, play, time, possession, or position. Players are not limited to merely wagering on the winner of a particular sporting event or point spread, but may wager on which team will be up at the end of a quarter or half of game play, which player will receive the next possession, or whether the next play in a football game will be a pass or a run, who is going to make the next dunk, three-point shot, goal, touchdown, or basket, for example.

Thus, in accord with the present concepts, micro-betting on the sportsbook is permitted. To facilitate micro-betting, the oversight of the sportsbook is advantageously decentralized to a plurality of specialists controlling odds and wagering for each subspecialty (e.g., each individual sport). Alternatively, any player in the room may propose a bet and any other player can either take the bet or reject the bet. Thus, a player of a handheld gaming machine 110 may text message or otherwise contact (e.g., message output to an area display) the other players of other handheld gaming machine, and optionally standup gaming machines, in a sportsbook area. The sportsbook area may be located within one area of a single gaming establishment, a plurality of locations in a single gaming establishment, or a plurality of locations across a plurality of gaming establishments (related or unrelated). In at least some aspects, the utilization of a handheld gaming machine 110 to conduct sportsbook wagering, inputs, and/or information exchange (e.g., browsing sportsbook odds and information) is enabled any public area within the gaming establishment and is not constrained to any arbitrary location (e.g., the sportsbook area).

In accord with still other concepts, fantasy football may be integrated into a wagering game available at least to the handheld gaming machines 110. A player may build a team on the handheld gaming machines 110 or on a terminal or kiosk configured to facilitate creation of a team for a fantasy football league. Once a first player selects a team, he or she may then present his or her team for competition against another team. A second player having created another team may then accept the challenge and pit his or her team against the first player's team. Once the teams have been selected and played, the players can then watch the games and/or engage in other activities. Alternatively, in other aspects, the player may be permitted to trade one or more players in the middle of a game. The trading of fantasy football (or fantasy hockey, basketball, or soccer) players may be time-limited (e.g., only between noon and one o'clock), periodic (e.g., fifteen minutes every two hours), or location-limited (e.g., player must be in the sportsbook zone or hot spot). In the latter aspect, sportsbook hot spots could be distributed about the gaming establishment to permit players to conveniently access the sportsbook environment (e.g., external systems 50) without physically returning to the sportsbook area. In some aspects, players may set up sportsbook accounts with the gaming establishment and may be permitted to access their sportsbook account and make changes through a home computer, cell phone or PDA, or publicly-accessible kiosk (e.g., in a grocery store, convenience store, gas station, shopping mall, or the like).

Advantageously, the communications (e.g., text messaging) is configured to utilize one or more protocols conventionally used by other handheld electronic machines, such as cell phones and PDAs, so that the player using a handheld gaming machine 110 can freely text message, or the like, not only other players using handheld gaming machine in the gaming establishment or in other properties of the gaming establishment, but also text message persons playing on different types of handheld gaming machines in other gaming establishments, or a cell phone or PDA located anywhere. Thus, a player in a casino in Las Vegas can send pictures and/or videos using a camera or video camera in the handheld gaming machine 110, text messages, and/or voice communications to a sick friend at home in Chicago, who was unable to go to Las Vegas. The sick friend could likewise sent pictures, video, text messages, and/or voice communications to the player in Las Vegas to share in the experience.

In accord with some aspects of the present concepts, the gaming establishment or games offered thereby may utilize as data or an input a location of a player's handheld gaming machine 110 within a room or area of a single gaming establishment. These aspects naturally limit the population of available handheld gaming machines 110 to those that are permitted to operate within the boundaries set by the gaming establishment. Alternatively, the gaming establishment or games offered thereby may advantageously utilize as data or an input a location of a player's handheld gaming machine 110 within a room or area of another gaming establishment, such as a commonly-owned or commonly-managed gaming establishment. For example, a group of related gaming establishments could have a similar room (e.g., a "Big Event" room) in each of the gaming establishments, and a group game involving all players having handheld gaming machines 110 in each of the similar rooms may experience the game collectively (e.g., all of the Big Event rooms are linked). Eligibility based on a location of the handheld gaming machine 110 may thus extent across multiple locations and properties.

The handheld gaming machine 110, in accord with various aspects, also serves as a cell phone. A player may optionally associate their home phone number or cell phone number to their player account or to the assigned handheld gaming machine 110 and have calls forwarded to the handheld gaming machine. Thus, when the player has the handheld gaming machine 110, they player is not required to carry other portable electronic devices. Significantly, in at least some aspects, the handheld gaming machines 110 are advantageously configured for use as a video telephone. Such handheld gaming machine 110 is configured, in one aspect, to inform a player or a call or to accept a call only following completion of a wagering game. Optionally, the handheld gaming machine 110 is further provided with a game interrupt feature to automatic pause a game in progress to inform a player of an incoming call and/or to receive an incoming call.

Although the present concepts have been generally disclosed to relate to a location of a handheld gaming machine 110 or a proximity of a handheld gaming machine to another handheld gaming machine or device (e.g., transmitter, receiver, transceiver, etc.), the present concepts also relate equally to vectors relating to a location of a handheld gaming machine. For example, in any of the disclosed concepts, a vector component (e.g., a direction of movement, a velocity, an acceleration, a reversal of movement, a rotation, etc.) may likewise serve as an input relating to an eligibility of a player for a game or game-related feature, a non-game-related feature, and/or an award.

To enhance the gaming experience, the external systems 50 (e.g., gaming network, gaming server, etc.) could, based on the location of the handheld gaming machine 110 or proximity of the handheld gaming machine to an external system transmitting/receiving node, automatically change the gaming experience. For example, the external systems 50 are configured, in at least some aspects, to reconfigure a player interface of the handheld gaming machine 110 display (e.g., backgrounds, colors, skins, etc.) to match the location of the player and/or selected content of the game displayed on the handheld wagering machine. For example, the casino has a lounge or location within a lounge devoted to a MONOPOLY games and theme. As a player enters such a lounge or location in the lounge, the player's handheld gaming machine 110 is automatically reconfigured to display a MONOPOLY themed display. As noted above, while in this location, the player is optionally constrained to play only MONOPOLY-themed games. Alternatively, the player is permitted to play any game on the handheld gaming machine 110, irrespective of the room or area theme. This reconfiguration may be automatic, to match the location (e.g., the symbols represented on the reels could change to reflect the theme of the room) or manual, reconfiguring the system only upon a player's acceptance of the reconfiguration.

In still another aspect, when the handheld gaming machine 110 is not actively in use, advertisements may optionally be displayed on the handheld gaming machine display 114 until such time as the user deactivates the advertisements by initiating play of a wagering game or by activation of another feature of the handheld gaming machine.

Handheld gaming machine 110 customization is another aspect of the present concepts. A player is advantageously permitted to configure their handheld gaming machine 110 to suit their individual game play preferences and/or non-game play preferences (e.g., features, appearance ("skin"), sounds, music, buttons, inputs, etc.) and store such settings or profile in the handheld game device and/or a memory, wherever located, associated with the external systems 50. A player may thus be permitted to imbue a bit of their personality and preferences into the handheld gaming machine 110 and may optionally be permitted to select a template or skin from among a plurality of stock templates or skins. As one example, a player returning to a gaming establishment is permitted to request a handheld gaming machine 110 pre-loaded with her previously stored game play preferences and/or non-game play preferences. Such stored game play preferences and/or non-game play preferences may be associated in a computer memory device with a Player's Club number or other identifying information. When the player picks up her handheld gaming machine 110, it is already loaded with all of her preferences, skin, personality, phone numbers, music selections, radio selections, buddy lists, personally-configured touch screen inputs, games, and the like. Likewise, a player is permitted, in advance of arrival at the gaming establishment, to go on-line and pre-configure a handheld gaming machine 110 to be ready upon his arrival. Similarly, a group of friends going to the gaming establishment may go on-line and pre-configure a plurality of handheld gaming machine 110 particularly for use between and affiliation with one another.

Still further, in at least some aspects, a player is permitted to transfer their stored game play preferences and/or non-game play preferences (e.g., a template or skin) to another player's handheld gaming machine if such another player grants rights to perform the transfer. This transfer optionally may occur in the bartering system noted above or in a direct handheld gaming machine 110 to handheld gaming machine transfer. In other words, a player devoting time to create a unique and personal configuration for their own handheld gaming machine 110 may permit others to adopt or copy their configuration, for a price. In some aspects, the player of the handheld gaming machine 110 may be permitted to transfer the stored game play preferences and/or non-game play preferences, such as a skin, from the handheld gaming machine to an upright gaming machine. Following completion of wagering game play on the upright gaming machine, such as may be determined, for example, by a lapse of play for a predetermined period of time or a motion sensor sensing a departure of the player, the upright gaming machine is configured to revert back to its initial default setting. The interface between the handheld gaming machine 110 and the upright gaming machine, in some aspects, could be automatic or dynamic. Thus, a player, having set up and stored all of their preferred sound and symbol settings, approach a Men in Black upright gaming machine and the handheld gaming machine 110 automatically wirelessly interfaces with the upright gaming machine and transfers the players customization features thereto. This feature, in some aspects, requires an enabling input from the upright wagering machine, which could be activated for example, by a player input.

In still additional aspects of the present concepts, stand alone games (e.g., upright gaming machines) provide two or more types of downloadable "rewards." A first type of downloadable reward includes a fractional award download, whereupon a player can accumulate the fractional downloads and then later redeem or enable the completed download once all of the fractional award downloads have been collected. For example, in the classic WMS slot game "X Factor" a player would collect 10 power points and then the X factor multiplier would increase. In the present concept, the fractional download, such as power points, would be accumulated in the player's handheld gaming machine 110. After a predetermined number of power points are collected, the player would be provided the opportunity to transfer a new X Factor back into the game. The second type of downloadable reward comprises the automatic or manual downloading of "fun" content from games on each visit to the game or to a location. For example, on one day, a player is able to download characters from the game. On another day, the player is able to download the jackpot tune for use as a ring tone. This content generally permits players who are fans of a certain game to optionally take home a piece of their game with them every time they play. For example, when a player cashes out, the handheld gaming machine 110 displays a pop-up window informing the player that a free ring tone may be downloaded to their account and/or portable electronic device.

In all of the above aspects and examples of the present concepts, it is to be emphasized, as previously noted, that the term handheld gaming machine 110 is not limited to the configuration or device depicted in FIG. 1(*b*), but may rather include any handheld electronic device configured to support wagering gaming applications and wireless or hardwired communication with the external systems 50. Thus, the term handheld gaming machine 110 includes, but is not limited to, cell phones and PDAs.

In accord with any of the above examples of shared-experience games, such as, but not limited to, team or group play (e.g., competitive or cooperative), the selection of a player for participation in any given team or group may itself derive from an eligibility based on location (or proximity). Team or group eligibility may therefore be based on location, proximity, or other factor (e.g., affiliation).

Figure 3A:
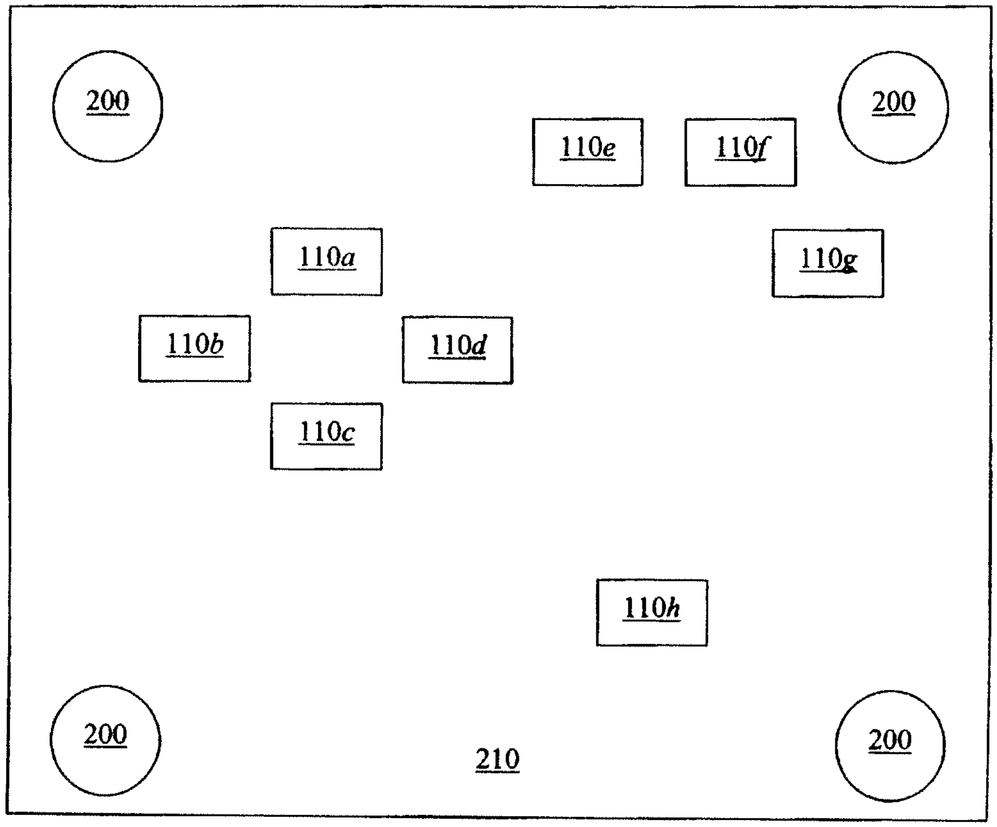
FIGS. 3(*a*)-(*f*) depict examples of game play in accord with at least some aspects of the present concepts.
Figure 3B:
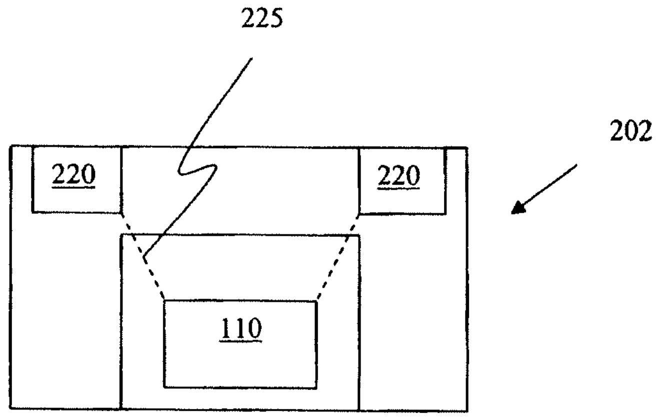
Figure 3C:
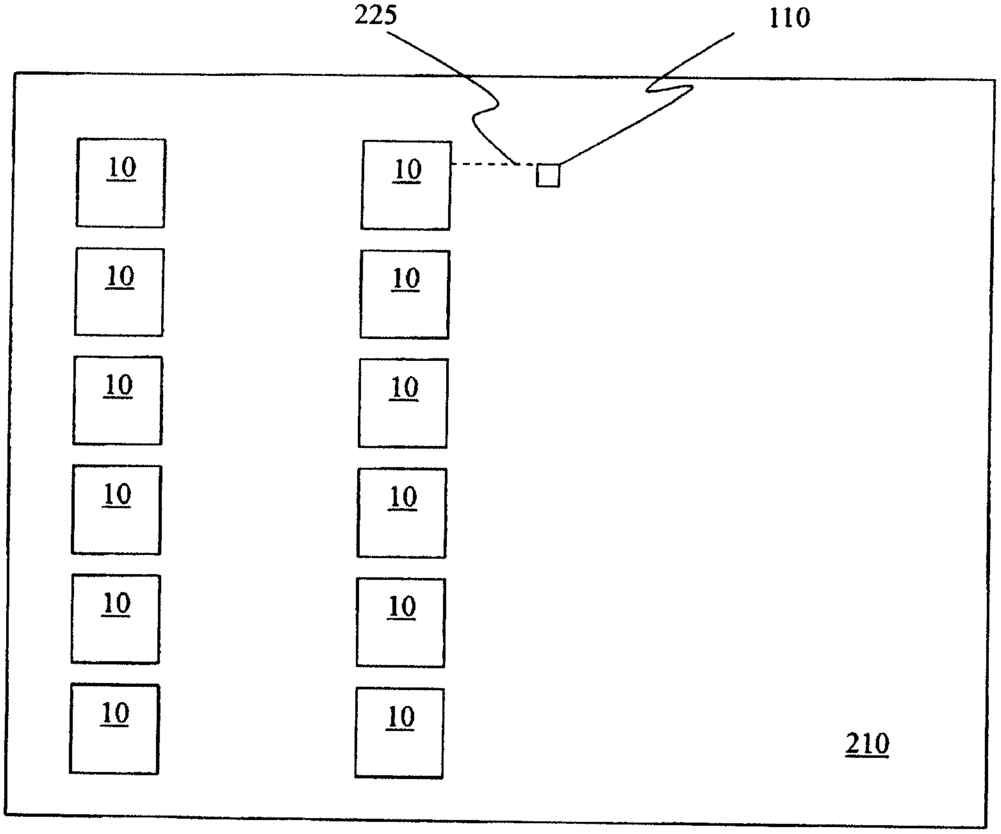
Figure 3D:
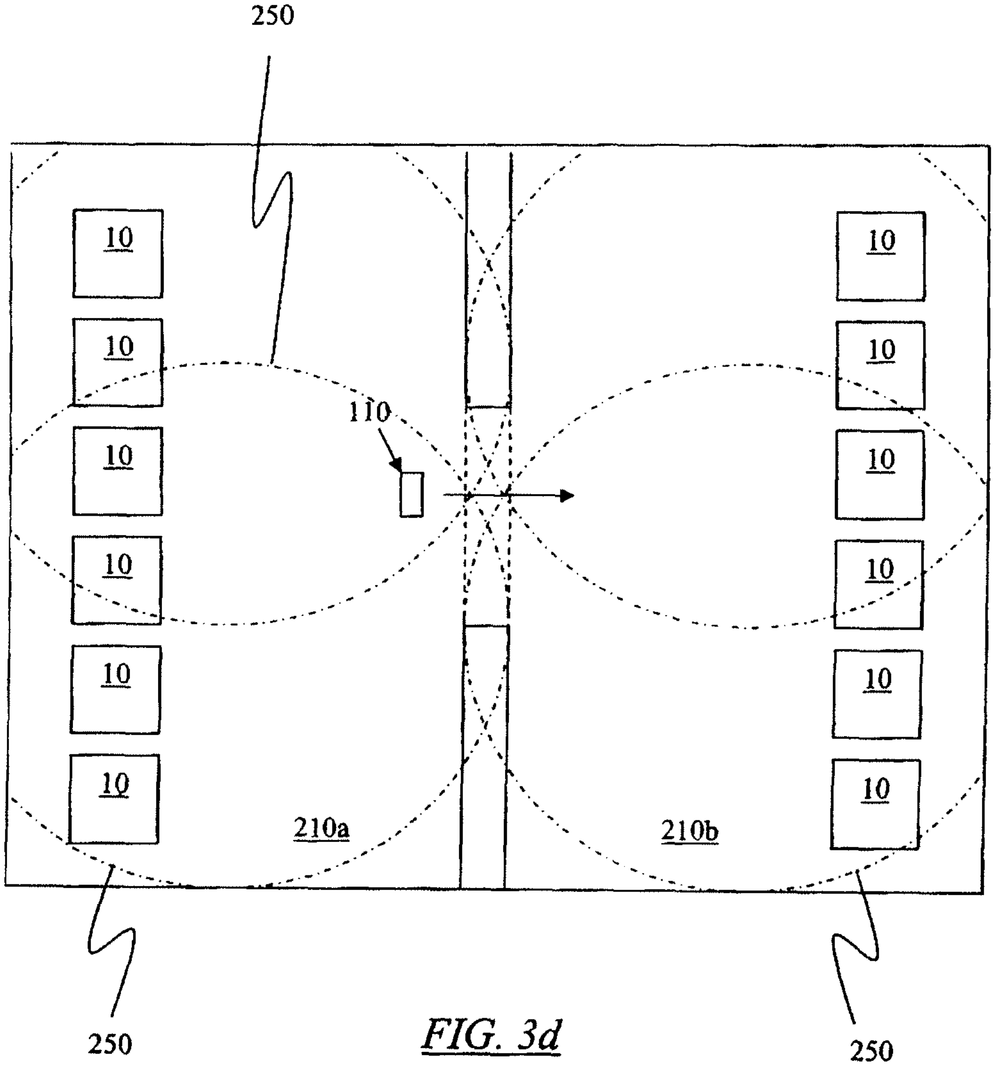
Figure 3E:
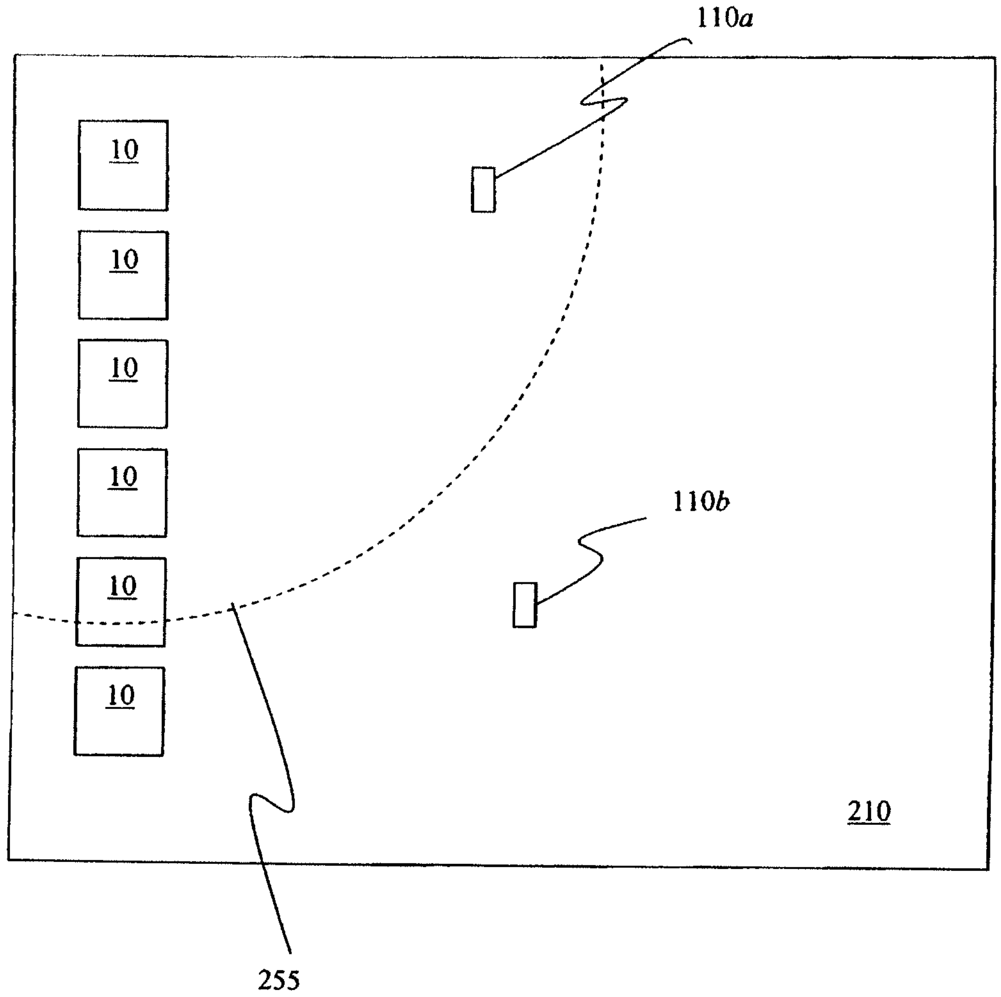
Figure 3F:
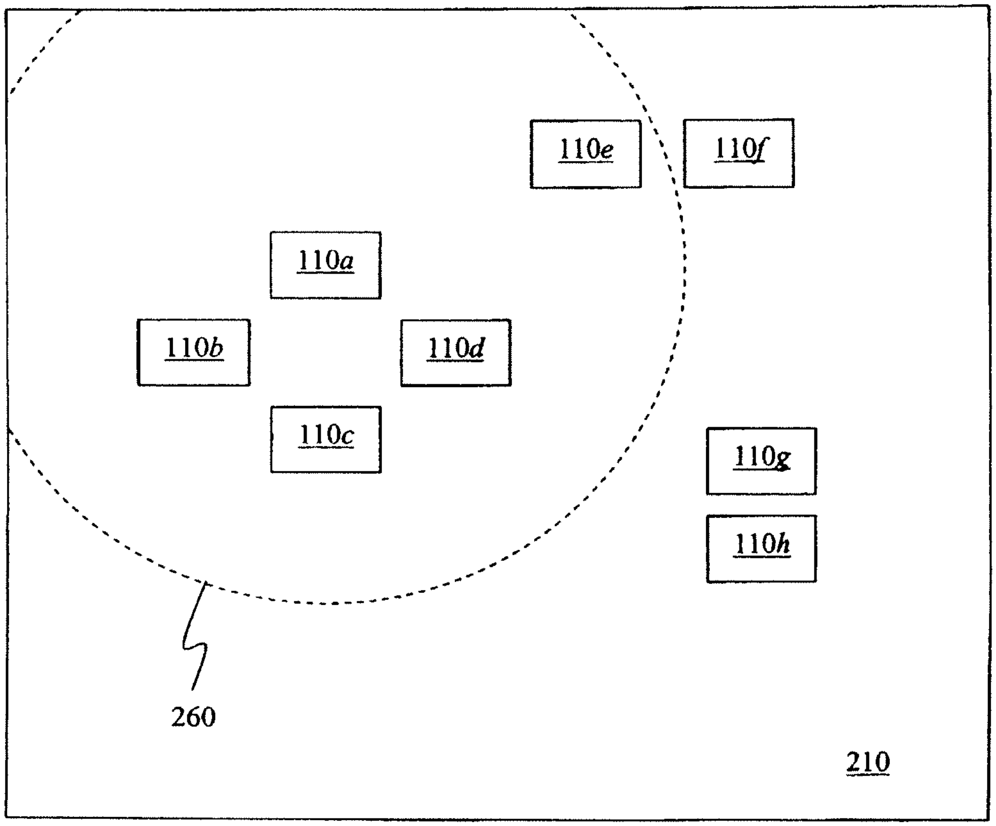
Figure 4A:
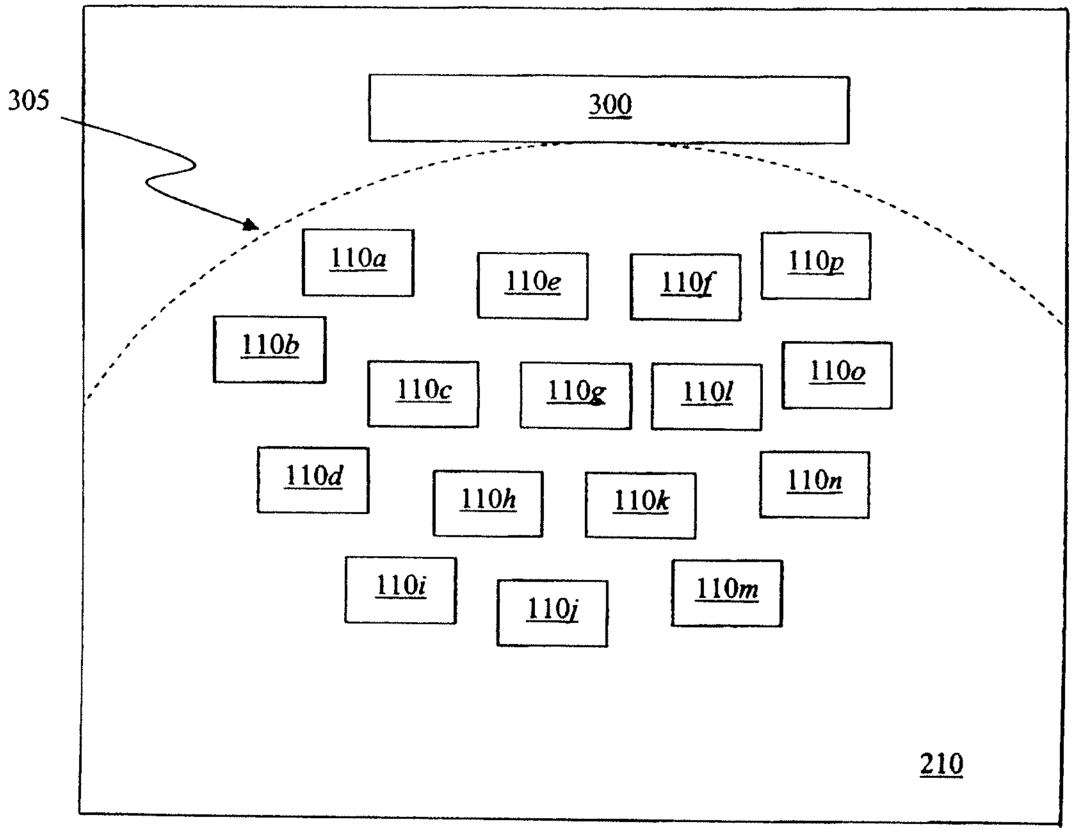
FIGS. 4(*a*)-(*d*) depict examples of game play in accord with at least some other aspects of the present concepts.
Figure 4B:
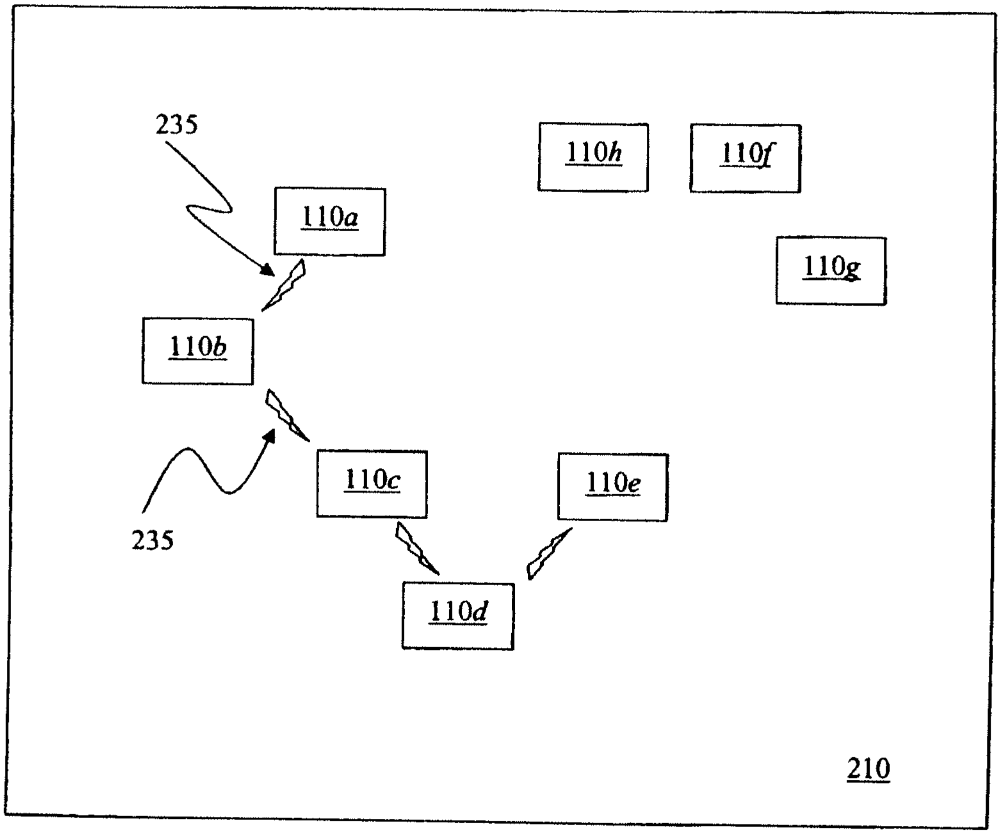
Figure 4C:
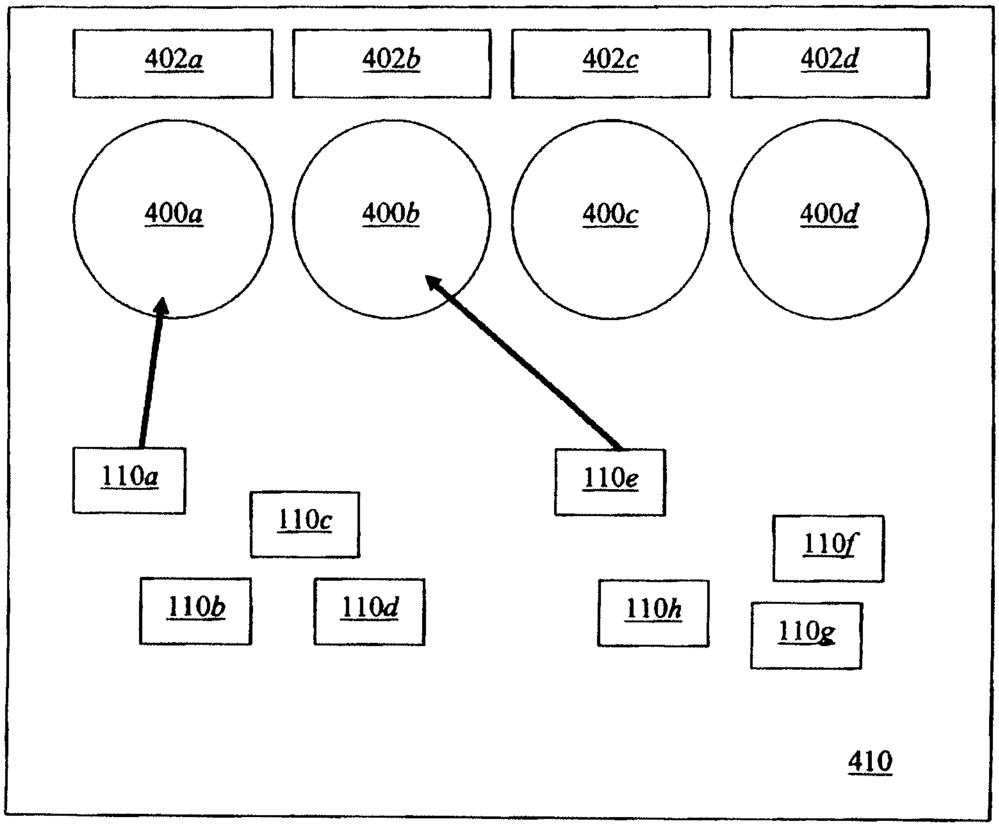
Figure 4D:
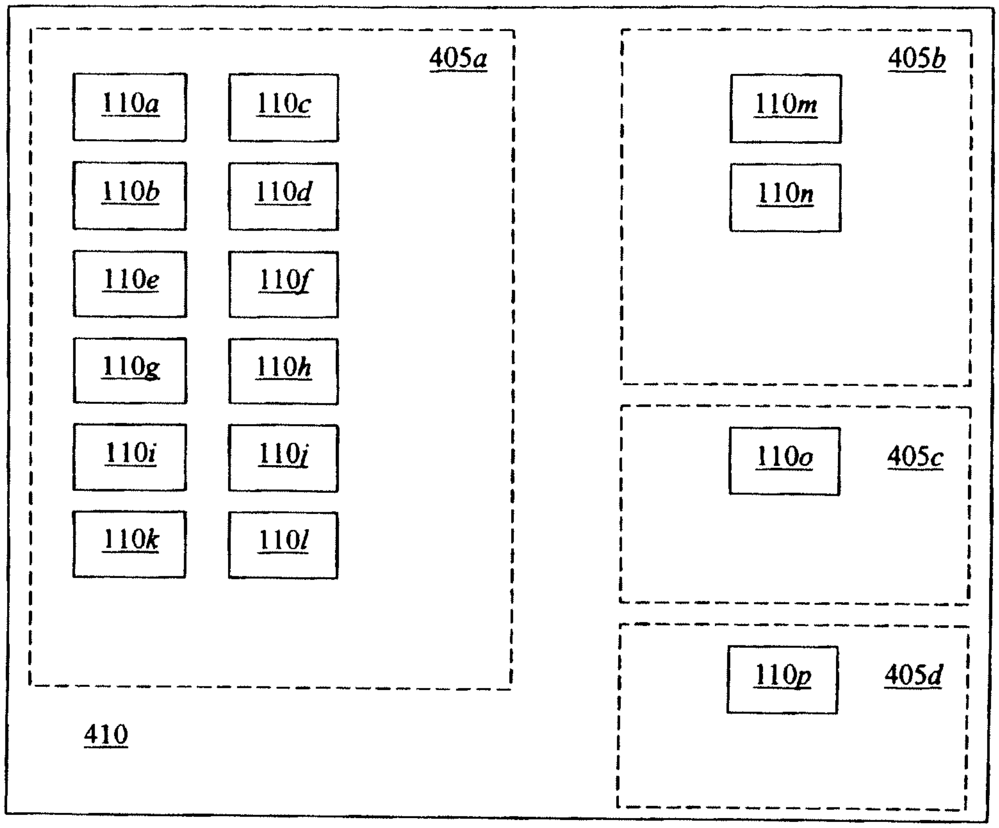

In accord with any of the above aspects, the handheld gaming device is optionally configured, via any combination of hardware, software, and/or firmware, such that game-related features and/or non-game related features may be selectively enabled upon the existence of a minimum signal strength from the gaming establishment's transmitter(s), transceiver(s), wireless access point(s), and/or hot spot(s), which may or may not be connected to external systems 50. For example, at least some of the transceivers or transmitters may be stand-alone devices independent of any external systems. Instead, such transceivers or transmitters interact directly with the handheld gaming machine 110. Thus, the access to certain features and/or menus are optionally contingent upon a general location of the handheld gaming device relative to a specific point (e.g., radial distance of a handheld gaming machine 110 relative to a transmitter 200, such as shown in FIG. 3*a*). For example, certain menu options (e.g., funds transfers, wager commands, etc.) may require a strong signal (e.g., 4 or 5 bars on a 5-bar scale) from a transceiver, or the like, associated with a WiFi "hot spot" to be enabled, whereas other menu options (e.g., a casino map, game menus, information, help screens, etc.) may require only a weak signal (e.g., 1 or more bars on a 5-bar scale). Correspondingly, in at least some aspects, a dropped signal is configured to automatically pause any game in progress or activity in progress until a signal of a predetermined minimum strength is reestablished.

Figure 5:
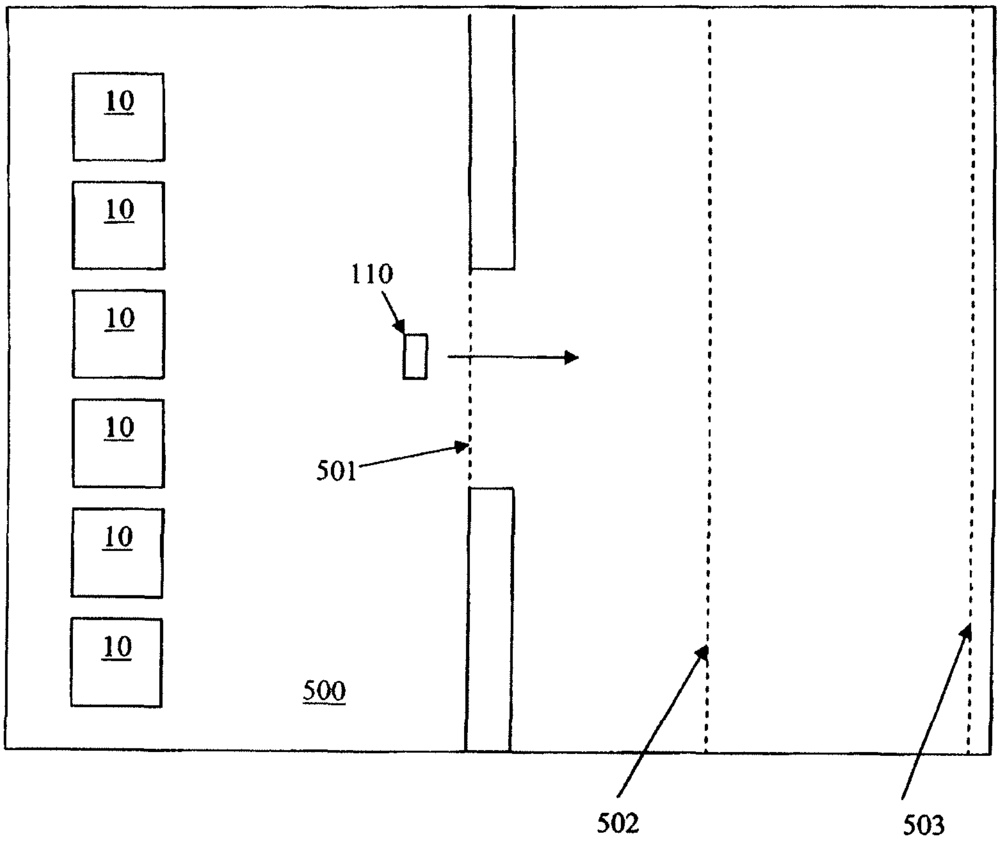
FIG. 5 shows a representation of location-related features in accord with at least some aspects of the present concepts.

The aforementioned methods and devices for determining a location of the handheld gaming machine 110 (e.g., GPS devices, triangulation, signal characteristic analysis, signal strength, etc.) are also utilizable as a disabling security feature for the software, firmware and/or hardware. The disablement of the handheld gaming machine 110 is preferably, but not necessarily, preceded by visual, auditory, and/or other sensory warnings to the player. In an example depicted in FIG. 5, a person holding a handheld gaming machine 110 is leaving a room 500 and approaching a first boundary 501. At or around the first boundary 501, the handheld gaming machine begins to emit sounds (e.g., a chirp), exhibit color changes on the display, display pop-up warnings or scrolling text, icons, or messages, vibrate, and/or outputs other sensory information using the same or other devices, but will not compromise or disable game play. As the handheld gaming machine 110 is carried to a second boundary 502, beyond the first boundary 501, which denotes a predetermined limit of play of the handheld gaming machine 110 (e.g., leaving a secure area), the handheld gaming machine 110 is advantageously configured to electronically disable the player input devices 124, such as buttons and/or a touch screen display 114, 116, and/or output a signal to the gaming establishment of the state and location of the handheld gaming machine.

The disabling security feature may itself comprise a progressive disablement based on location. For example, using the above example of a first boundary 501 and a second boundary 502, a first set of features may be disabled at the first boundary and a second set of features may be disabled at the second boundary. Additional boundaries may also be provided to further delineate the functional disablement. Accordingly, in these embodiments, as a player walks away from a designated handheld gaming device playing area for a particular game, such as room 500 in FIG. 5, the player will notice that various features and options are no longer available and will preferably receive notification of any such disablement and instructions as to removal of such disablement. For example, a player leaving a Monopoly-themed room (e.g., a first boundary) would see the Monopoly-themed games and options on the handheld gaming machine 110 disappear with an attendant message that the player has left the approved Monopoly-themed room and that if they would like to again enable such features that they can return to the Monopoly-themed room whenever they desire.

In accord with the above-noted electronic disabling feature, the handheld gaming machine 110 hardware, software, and/or firmware is configured as a "watchdog" to ensure that handheld gaming machine is temporarily rendered inoperable or non-functional, or selectively/partially in-operable, based on the location of the handheld gaming machine. In at least some aspects, an employee of the gaming establishment may be required to enable the handheld gaming machine 110 for the player following the occurrence of a disabling condition. Optionally, the disabled electronic devices may be automatically enabled upon a player's satisfaction of an enabling condition, such as returning to within the above-noted first boundary of the secure area.

Additionally, a third boundary 503, beyond the first boundary 501 and second boundary 502, is advantageously imposed as a security barrier. Any handheld gaming machine 110 carrier beyond the third boundary 503 would automatically activate a silent alarm and/or an area alarm (e.g., a door alarm) to indicate the possible theft of, or inadvertent removal of, the handheld gaming machine. The location of the handheld gaming machine 110 would then be individually tracked (e.g., via a GPS system) and relayed to gaming establishment personnel on the premises to intercept the player and render assistance.

Figure 6:
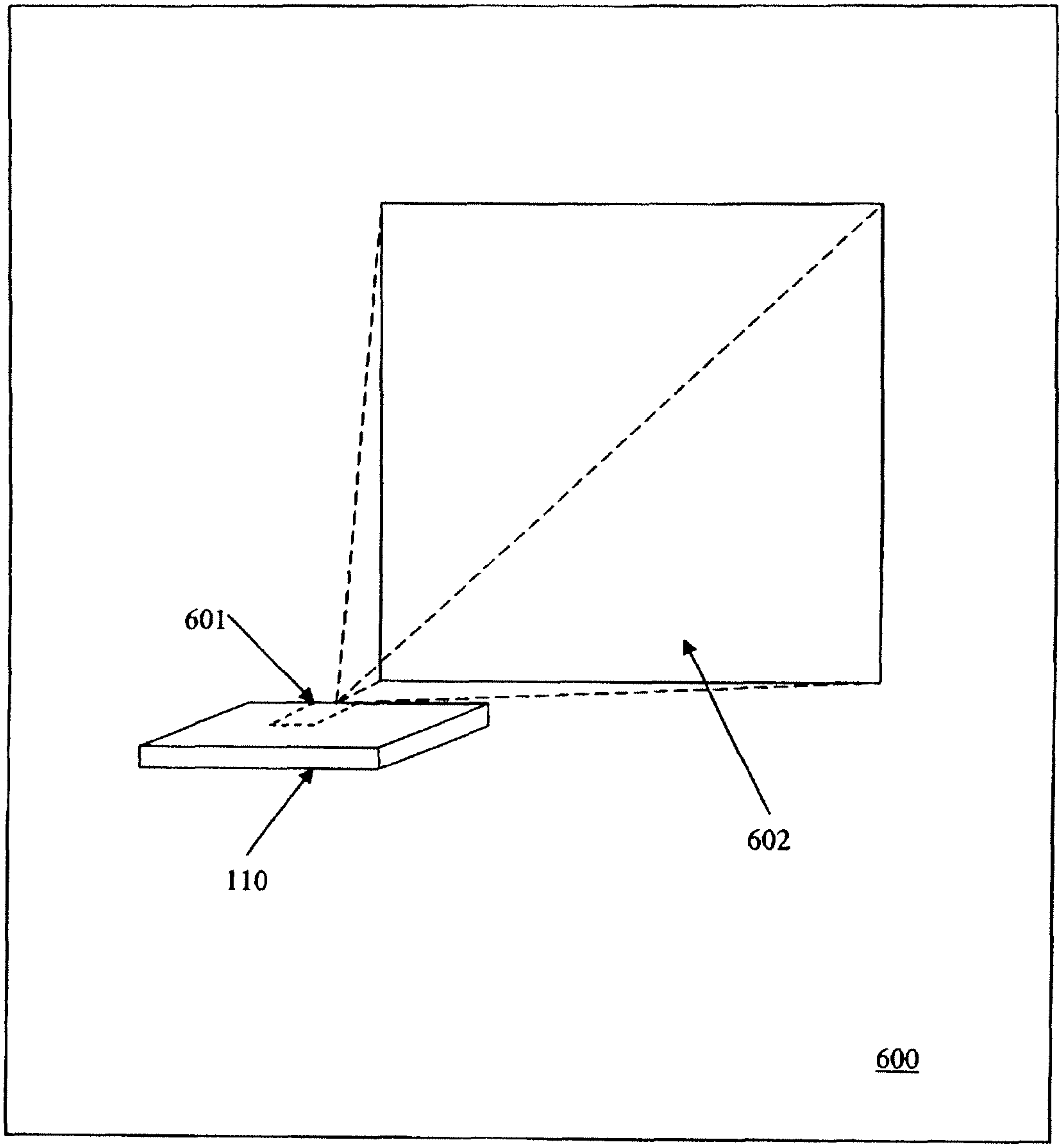
FIG. 6 shows a representation of a projector-enabled handheld gaming machine in accord with at least some aspects of the present concepts.

In at least some aspects, a projector 601 may advantageously be integrated with and/or activated by the handheld gaming machine 110, such as represented by FIG. 6. Projectors 601 of a suitable size to incorporate into the handheld gaming machine 110 include, but are not limited to, those manufactured by DigiSlide of Adelaide, Australia (Digismart) and Light Blue Optics of Cambridge, UK (PVPro). These projectors 601 are generally thumb-sized or match-box sized micro-optical devices that can project full color images or video (e.g., 11"×17" projected image) on walls or other surfaces 600.

The projector 601 in a projector-enabled handheld gaming machine 110 serves, in at least some aspects, as an alternate to the primary display 114 or secondary display 116. Thus, the operation of the projector 601 could be controlled by the player in some aspects. In other aspects, however, the projector 601 comprises a component of the game play itself and the controller 34 controls the operation of the projector, optionally with some player input (e.g., a player's input of a "ready" signal). For example, a game, a game feature, or special event associated with a game may require that the player move to a suitable viewing position to view the projected screen(s) and/or information, represented by reference numeral 602 in FIG. 6. The player may be informed that they have a certain time limit to find the nearest viewing position (e.g., one minute) or may be informed that the game, a game feature or special event will continue upon the player's input that they are ready to continue. Viewing positions may comprise any substantially planar and substantially smooth surface, but optionally may include a plurality of viewing screens mounted on walls in various areas of the gaming establishment.

In still other aspects of at least some embodiments of the present concepts, the projector 601 may comprise an integral part of a game such as, but not limited to, the "search and find" or treasure/scavenger hunts games noted above. The players are required to move through the gaming establishment and find, within a predetermined period of time (or an unlimited time), one or more "objects" located within the gaming establishment to advance the game. Although the objects are provided some visual or tangible representation to the player, typically in the theme of the game, the objects are, more generally, representations of states within the gaming logic such as, but not limited to, a flag/switch, counter, data elements, and/or instructions that permit or prohibit subsequent actions based on the state thereof (e.g., on/off, a particular count, a particular data element in a memory device, etc.).

The representation of the objects to the player may comprise, for example, pieces of a puzzle that must be found, collected, and solved by the player which include, in at least some aspects, an image or video projected from projector 601. For example, once a tracking system for the handheld gaming machine 110 outputs a signal or signals indicating to a controller that a player is a predetermined location wherein the player is entitled to view or collect another clue, a projection is optionally triggered. For example, a player is notified that a new clue is incoming and that they should point their handheld gaming machine 110 projector 601 against a suitable viewing surface 600, such as shown in FIG. 6. The "object" is then associated with the handheld gaming machine 110 and stored locally on the handheld gaming machine and/or stored remotely in association with the handheld gaming machine. An icon of the object or representation of the object obtained is also preferably displayed on the display 128 of the handheld gaming machine 110. Using the above example, a player is awarded a predetermined award for each puzzle piece collected and is optionally awarded an additional bonus upon completion of the puzzle. Numerous other implementations of projector-assisted game play are also possible in accord with the present concepts.

Alternatively, in lieu of transmission of an "object" or clue to a handheld gaming machine 110 based on a sensed location of the handheld gaming device, such as by using trilateration, an object or clue may be optionally made available to the handheld gaming device based on the proximity of the handheld gaming device to a transmitter, transceiver, transponder, or the like locally disposed within the gaming establishment. For example, the handheld gaming device 110 may comprise a transponder, such as the TI-RFid™ transponders manufactured by Texas Instruments. The transponder could be, for example, low frequency transponders, Ultra High Frequency & High Frequency ISO Transponders, Packaged High Frequency ISO Transponders, or High Frequency ISO Transponders, such as those shown on www.tiris.com. When the handheld gaming machine 110 is disposed proximate to a transceiver (e.g., 200, FIG. 3*a*) disposed about selected areas of the gaming establishment, a short-range signal from a transceiver is received by the transponder, which then outputs a return signal to the transceiver. The return signal may include, for example, a signal at a different frequency than the incident signal, a predetermined message or instruction responsive to the incident signal, or a different reply signal. Preferably, the output signal bears data identifying the handheld gaming machine 110 and/or player. Thus, when the handheld gaming machine 110 is brought within a range of a transceiver (e.g., 200), or the like, the transponder outputs a signal (e.g., an RF signal) comprising data including, but not limited to, a player ID, machine ID, game-related information, and/or player-related information. The transceiver may also output write signals to update a memory associated with the transponder and/or a memory of the handheld gaming machine 110 relating to the interaction between the handheld gaming machine and the transceiver. In this way, the transceiver may update the handheld gaming machine 110 to enable additional features or options responsive to the collection of the object associated with the transceiver.

In lieu of or in addition to a transponder, as noted above, the handheld gaming machine 110 may employ one or more of a transceiver, transmitter, receiver, RFID tag, GPS device, and/or other device capable of facilitating a location-tracking function with external systems 50 (e.g., one or more of a satellite(s), controller(s), server(s), transceiver(s), transmitter(s), receiver(s), etc.). Certain of the components associated with the external systems 50, such as transceiver(s), transmitter(s), and/or receiver(s), may be distributed in select locations about the gaming establishment.

In other aspects of at least some embodiments of the present concepts, a movement sensor 200 (e.g., a tilt sensor) is provided comprising one or more sensors configured to determine the movement (e.g., rotation, translation, etc.) of the handheld gaming machine 110 with respect to an established datum or reference (e.g., position, spatial orientation, reaction, force, velocity, acceleration, electrical contact, or characteristic from which another position, reaction, force, velocity, acceleration, electrical contact, or characteristic may be compared) about or along one or more axes. Additionally or alternatively, as noted above, the handheld gaming machine 110 comprises a positioning or tracking device (e.g., a GPS system, trilateration, etc.) in combination with a conventional analog compass or digital compass (e.g., a Devantech R117 compass) which optionally outputs information on direction or bearing to the display 114, 128. U.S. Patent Application No. 60/818,132 filed on Jun. 30, 2006, titled "Method And Apparatus For Use Of Movement And Position Sensors With Portable Handheld Wagering Devices," discloses handheld gaming machines 110 which may advantageously be utilized in combination with the present concepts and is incorporated herein by reference in its entirety.

Other components such as, but not limited to, a digital rangefinder, ultrasonic ranger, RFIDs, or laser-based rangers (e.g., employing time of flight measurement techniques measuring a time interval between a transmitted pulse and the reflected pulse, etc.) are also advantageously integrated with the handheld gaming machine 110 to provide additional avenues of interaction between the handheld gaming machine and the gaming establishment environment.

The above-noted combinations of devices permit additional degrees of freedom in developing gaming applications and/or non-gaming applications to seamlessly integrate the handheld gaming machine 110 into the surrounding environment. For example, detailed spatial orientation information (e.g., both the location of the device and orientation of a device in space) using one or more of the above-noted devices permits determination of whether the player is pointing the handheld gaming machine at a specific sign, progressive meter, handheld gaming machine, upright gaming machine, or the like. This information, in turn, is used by the controller 34, peripheral components, and/or external systems to cause the display of information, options, and/or screens directly related to the environment directly in front of the player. Thus, if the player is facing a Big Event game, an interactive map could automatically pop-up to show the player which Big Event games the player could access and display options or other information in accord with a specific bank to which the handheld gaming machine 110 is directed. In this way, players may, for example, discretely learn about the various games, rules, options, gaming establishment offerings, or the like.

Interaction and exchange of signals and/or data (e.g., carrier signals) between the device(s), of whatever type, borne by the handheld gaming machine 110 and the device(s), of whatever type, disposed in the gaming establishment permits not only location of the handheld gaming machine 110 and/or orientation of the handheld gaming machine, but also integration of the handheld gaming machine with the local environment. The particular signal types, frequency, ranges, encoding, encryption, data transfer speeds, etc. may be freely varied to a desired end in a manner known to those skilled in the art of data communications. In one embodiment, the tracking of each handheld gaming machine 110 is handled by an Ubisense (of Cambridge, England) real-time location system (RTLS) utilizing ultra-wideband (UWB) technology, which is capable of location-determination within 30 cm (i.e., about 12") in 3D. In such arrangement, a network of UWB sensors are installed and connected into the gaming establishment's network to detect and react to the position of corresponding radio tags, which may be embedded within the handheld gaming machine 100, attached to the handheld gaming machine, or simply given to the player for the player to wear (e.g., bracelet, necklace, etc.) or carry. The sensors send the tag location information to the Ubisense software platform, which creates a detailed, real-time view of the environment. This model can be used by an unlimited number of simultaneous programs that are able to respond immediately to changes in the space that is created. The Ubisense Platform responds instantly to changes in the environment, so that applications can respond to events at the moment that they occur and provide real-time spatial interactions involving people and objects.

The handheld gaming machine 110 is thus endowed with the ability to "respond" to the local environment in the gaming establishment, such as in the collection of "objects" in the gaming establishment, as noted above. Additionally, the gaming establishment, in turn, is endowed with the ability to respond to the handheld gaming machine 110. For example, during game play, the player may have satisfied conditions precedent to the opening of a special door that leads to an exclusive lounge or to one of a series of separate rooms or locations provided in association with the wagering game. The controller would optionally notify the player, directly or indirectly, of the unlocking of the door (or other feature). The positioning of the handheld gaming machine 110 near such door and communication between the handheld gaming machine and control system for the door would then cause the door to open for the player.

In some aspects, at least some of the "objects" may relate generally non-consequential customization aspects of the handheld gaming machine 110, such as the appearance of the display, music, sounds, or the like, to permit a player accumulating a minimum amount of assets or a certain type of asset to provide additional distinctiveness to their handheld gaming machine.

In some other aspects, however, the collection of assets relates to consequential aspects of game play. As one example, the player is permitted to access higher levels of game play, such higher levels of game play offering higher awards, improved odds of winning, improved bonus rounds, and/or simply different game play experiences. In accord with some embodiments, the collected asset(s) endow the handheld gaming machine 110 and/or player persona within a game (e.g., character or avatar in the game) with the ability to achieve different results within the game.

In one example of the above concept, a fantasy-based theme akin to Dungeons & Dragons (Tactical Studies Rules (TSR)) may permit a player to select from a variety of different characters to complete a mission, quest, or campaign. As the player continues to play and amass awards (e.g., experience points, objects, etc.) the player's character ascends to higher and higher experience levels and is capable of achieving different and improved results in the game in accord with such level. A player having a character of a fighter character class may obtain an object (e.g., a sword), collected during game play, that would provide the player better odds of defeating a monster in a subsequent encounter. A player having a character of a mage may obtain a spell that could be beneficially utilized in one or more subsequent encounters, at the player's discretion. The player's selection of a character type, as well as other player-selectable character factors (e.g., alignment) and optional randomly-generated character factors (e.g., strength, dexterity, wisdom, comliness, etc.), which may or may not be revealed to the player, may also be advantageously used as modifiers to game play. For example, each encounter with another character in the wagering game (e.g., base game, bonus game, etc.) would yield different odds and/or outcomes, perhaps resulting in different game play story lines, based on whether a player has selected, for example, a cleric character or a fighter character. On the whole, however, the overall odds for all of the different character types and/or character factors would be preferably, but not necessarily, substantially balanced.

The variation of different character types and/or character factors permits and encourages team building between players. Players may play individually, but may optionally link together as a group and the subsequent encounters in the wagering game environment, such as in a bonus game, are then determined on a group, rather than an individual basis. The encounters in the gaming environment may be scaled up in proportion to the size of the group of characters to essentially maintain the overall odds of the game. Optionally, the odds or expected value may be altered slightly (e.g., 1%, 1.5%, 2%, 2.5%, 3%, etc.) to favor team play and incentivize players to interact with one another in a group environment.

Moreover, to foster additional excitement, a physical gaming environment may be created for a specific game-theme. For any of the above examples (e.g., Dungeons & Dragons, treasure hunt, etc.) or other game types or existing wagering game themes, a large-scale amusement/wagering facility with numerous rooms and areas for exploration may be created to enhance the wagering game experience. The rooms and areas are preferably decorated in the theme of the game and are preferably, but not necessarily, configured to respond to the player's presence, or more accurately the handheld gaming device's 110 or tracking device's presence, via automatically-actuatable devices (e.g., sound effect speakers, alterable lighting, movable doors, actuators, etc.). The rooms and areas are preferably, but not necessarily, configured to respond to player inputs not only on the handheld gaming device 110, but also on player-selectable or player-actuatable objects within the rooms and areas. Thus, advancement within the game, or even physical advancement within the physical gaming environment, may be made contingent upon a combination of player inputs on both the handheld gaming machine 110 and on player-selectable or player-actuatable objects within a room or area.

To maintain the excitement of any game employing collection of objects within the gaming establishment, and to discourage the practice of vulturing, each treasure hunt themed game or object collection based game may be randomly generated from a large population of available distribution locations such that each player's game is different from every other player's game. In other words, where a plurality of people are individually playing a quest-themed game, player one may be assigned a first set of quest locations (e.g., $A_1$, $A_2, \ldots A_n$), player two may be assigned a second set of quest locations (e.g., $B_1$, $B_2$, . . . $B_n$), and player two may be assigned a second set of quest locations (e.g., $N_1, N_2, \ldots N_n$), where n and N are any integer. Thus, a player cannot simply watch another player and follow behind and jump on a spot on which another player just received a clue or award. For example, player one, see that player two just located an object at position $B_2$ next to a Big Event sign, cannot simply go over and expect to obtain an object at that position since position $B_2$ is not on player one's set of quest locations. In at least some aspects, the distance of each of the quest locations from a specified point may be within a fixed range and/or the cumulative distances of the quest locations in a set may be optionally equalized, or substantially equalized, between the various sets of quest locations. In another aspect, the distance of the path between all discrete points in each set of quest locations is equalized.

Likewise, in a physical gaming environment, such as noted by way of example above, the inputs by a player within a room, whether such inputs are player inputs on the handheld gaming machine 110 or player inputs on player-selectable or player-actuatable objects within a room or area, may also be randomly-selected and uniquely associated with a particular handheld gaming machine. Thus, a first player in a room may be required to satisfy a first set of inputs (e.g., $A_1$, $A_2$, etc.), whereas player two may be required to satisfy a second set of inputs (e.g., $B_1$, $B_2$, etc.)). Again, in this manner other players may not simply watch another player and take advantage of their ingenuity or good fortune. Thus, advancement within the game, or even physical advancement within the physical gaming environment, may be made contingent upon a combination of player inputs on both the handheld gaming machine 110 and on player-selectable or player-actuatable objects within a room or area.

Each of these embodiments and obvious variations thereof is contemplated as falling within the spirit and scope of the claimed invention, which is set forth in the following claims. For example, any of the above aspects may be implemented as a persistent-state game. Thus, a player may be permitted to stop a persistent-state treasure hunt game or quest at any desired point of game play and resume the game or quest at the point where the player previously left the game or quest. For a team game, if the other players are not known and it is unlikely to reform the team to continue on in a persistent-state game, individual players may be prompted to leave the team before storing the player's data or the player may simply be informed upon reentry into the game that the other group members are no longer available, at which point the player may be presented with various options (e.g., continue individual play, join another group of available players, etc.).

What is claimed is:

1. A gaming system for communicating with a handheld gaming machine via a network, the handheld gaming machine being configured to display at least one wagering game, the gaming system comprising:

at least one processor; and at least one memory device operatively connected to the at least one processor and storing instructions which cause the at least one processor to:

responsive to the handheld gaming machine being connected to the network, determine if the handheld gaming machine is eligible for a wagering game-related feature based upon a gaming machine location of the handheld gaming machine or a gaming machine proximity of the handheld gaming machine to an external device, or both; and responsive to the handheld gaming machine being eligible for the wagering game-related feature, transmitting the wagering game-related feature to the handheld gaming machine via the network, wherein the transmitting the wagering game-related feature enables wagering game content in the at least one wagering game on the handheld gaming machine, the wagering game content not being enabled when the handheld gaming machine is outside a predetermined location or a predetermined proximity to the external device, or both.

2. The gaming system of claim 1, wherein the enabling the wagering game content includes enabling a bonus wagering game for play on the handheld gaming machine.

3. The gaming system of claim 1, wherein the enabling the wagering game content includes modifying the at least one wagering game already available for play on the handheld gaming machine.

4. The gaming system of claim 1, wherein the enabling the wagering game content includes enabling an individual wagering game, a group wagering game, a bonus wagering game, a basic wagering game, or any combination thereof, in addition to the at least one wagering game already available for play on the handheld gaming machine.

5. The gaming system of claim 1, wherein the at least one memory device stores additional instructions which cause the at least one processor to:

determine if the handheld gaming machine is communicatively connected to the network; and if the handheld gaming machine is communicatively connected to the network, determine the location of the handheld gaming machine, the proximity of the handheld gaming machine to an external device, or both.

6. The gaming system of claim 1, wherein the location comprises a room, an area, or a hot spot, or any combination thereof, all within a gaming establishment.

7. The gaming system of claim 1, wherein the location comprises a mobile hot spot.

8. The gaming system of claim 7, wherein the mobile hot spot comprises another handheld gaming machine.

9. The gaming system of claim 1, wherein the external device comprises another handheld gaming machine.

10. The gaming system of claim 1, wherein the location is determined using a global positioning system, triangulation of a signal output by the handheld gaming machine, a comparison of a signal output by the handheld gaming machine between at least two different receivers, an RFID signal, a short range wireless connection between the handheld gaming machine and a stationary receiver, a short range wireless connection between the handheld gaming machine and a mobile receiver, or a physical connection of the handheld gaming machine to a port, or any combination thereof.

11. The gaming system of claim 1, wherein the location, the proximity, or both, are determined based on at least a signal strength of a signal output by the handheld gaming machine relative to at least one receiving device.

12. The gaming system of claim 1, wherein the wagering game content comprises a complete wagering game or bonus game, a portion of a wagering game or bonus game, a symbol, a symbol set, a color scheme, one or more icons, one or more characters, a video sequence, an animated sequence, one or more game images, a game arrangement, or game sounds and music, or any combination thereof.

13. A portable handheld gaming machine for playing a wagering game, the portable handheld gaming machine comprising:

a display device configured to display an outcome of the wagering game; and a communication interface for communicating with a gaming system via a network, the communication interface being configured to:

responsive to the handheld gaming machine being connected to the network, output a signal indicative of a gaming machine location of the handheld gaming machine or a gaming machine proximity of the handheld gaming machine to an external device, or both, and receive a signal indicative of an eligibility of the handheld gaming machine for a wagering game-related feature based at least upon the signal output by the handheld gaming machine; and responsive to the handheld gaming machine being eligible for the wagering game-related feature, download the wagering game-related feature from the gaming system via the network, wherein the downloading the wagering game-related feature enables wagering game content in the wagering game on the handheld gaming machine, the wagering game content not being enabled when the handheld gaming machine is outside a predetermined location or a predetermined proximity to the external device, or both.

14. The portable handheld gaming machine of claim 13, wherein the enabling the wagering game content includes enabling a bonus wagering game for play on the handheld gaming machine.

15. The portable handheld gaming machine of claim 13, wherein the enabling the wagering game content includes modifying the wagering game already available for play on the handheld gaming machine.

16. The portable handheld gaming machine of claim 13, wherein the enabling the wagering game content includes enabling an individual wagering game, a group wagering game, a bonus wagering game, a basic wagering game, or any combination thereof, in addition to the wagering game already available for play on the handheld gaming machine.

17. The portable handheld gaming machine of claim 13, wherein the eligibility of the handheld gaming machine for the wagering game-related feature is based at least upon the proximity of the handheld gaming machine to a predetermined number of other handheld gaming machines.

18. The portable handheld gaming machine of claim 13, wherein the location, the proximity, or both, are determined based on at least a signal strength of the signal output by the handheld gaming machine relative to at least one receiving device.

19. The portable handheld gaming machine of claim 13, wherein the external device comprises another handheld gaming machine.

20. A method of transmitting wagering game data from a gaming system to a handheld gaming machine via a wireless network, the gaming system including at least one controller, the method comprising:

responsive to the handheld gaming machine being connected to the wireless network, determining a gaming machine location of the handheld gaming machine or a gaming machine proximity of the handheld gaming machine to an external device, or both;

determining, via the at least one controller, an eligibility of the handheld gaming machine for a game-related feature, the eligibility being based, at least in part, upon the location or the proximity, or both, of the handheld gaming machine; and responsive to the handheld gaming machine being eligible for the game-related feature and connected to the wireless network, transmitting, via the wireless network, the game-related feature to the handheld gaming machine, wherein the transmitting the game-related feature enables wagering game content in a wagering game on the handheld gaming machine, the wagering game content not being enabled when the handheld gaming machine is outside a predetermined location or a predetermined proximity to the external device, or both.

* * * * *